United States Patent
Hoshi

(10) Patent No.: US 10,411,279 B2
(45) Date of Patent: Sep. 10, 2019

(54) FUEL CELL SYSTEM AND CONTROL METHOD FOR FUEL CELL SYSTEM

(71) Applicant: NISSAN MOTOR CO., LTD., Yokohama-shi, Kanagawa-ku (JP)

(72) Inventor: Kiyoshi Hoshi, Kanagawa (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 0 days.

(21) Appl. No.: 15/328,150

(22) PCT Filed: Jun. 16, 2015

(86) PCT No.: PCT/JP2015/067336
§ 371 (c)(1),
(2) Date: Jan. 23, 2017

(87) PCT Pub. No.: WO2016/013333
PCT Pub. Date: Jan. 28, 2016

(65) Prior Publication Data
US 2017/0214069 A1    Jul. 27, 2017

(30) Foreign Application Priority Data
Jul. 24, 2014 (JP) ................. 2014-151268

(51) Int. Cl.
*H01M 8/04* (2016.01)
*H01M 8/04746* (2016.01)
(Continued)

(52) U.S. Cl.
CPC ... *H01M 8/04768* (2013.01); *H01M 8/04014* (2013.01); *H01M 8/04029* (2013.01);
(Continued)

(58) Field of Classification Search
CPC ........... H01M 8/04768; H01M 8/0485; H01M 8/04708; H01M 8/04328; H01M 8/04302; H01M 8/04268; H01M 8/04225
See application file for complete search history.

(56) References Cited

U.S. PATENT DOCUMENTS

| 7,968,239 B2* | 6/2011 | Nakaji ................ B60L 11/1885 180/167 |
| 2009/0169928 A1* | 7/2009 | Nishimura ........ H01M 8/04037 429/415 |

FOREIGN PATENT DOCUMENTS

| EP | 2 075 867 A2 | 7/2009 |
| JP | 2007-66552 A | 3/2007 |

(Continued)

*Primary Examiner* — Anthony R Jimenez
*Assistant Examiner* — Paul D Baillargeon
(74) *Attorney, Agent, or Firm* — Foley & Lardner LLP

(57) ABSTRACT

A fuel cell system includes a gas supply passage configured to supply one of the anode gas and the cathode gas to the fuel cell, a refrigerant supply apparatus that supplies refrigerant for cooling the fuel cell to the fuel cell, a heat exchanger that exchanges heat between the refrigerant increased in temperature by the fuel cell and the gas supplied to the gas supply passage. The fuel cell includes a component that circulates the one of the anode gas and the cathode gas discharged from the fuel cell to the fuel cell, and a warm-up control unit that controls a flow rate of the refrigerant to a predetermined flow rate for warming up the fuel cell when the fuel cell is warmed up. The fuel cell system includes a gas temperature increase control unit increases the flow rate of the refrigerant to be supplied to the heat exchanger on the basis of a temperature of the gas circulated by the component or a parameter related to the temperature when the flow rate of the refrigerant is controlled by the warm-up control unit.

19 Claims, 17 Drawing Sheets

(51) Int. Cl.

| | |
|---|---|
| *H01M 8/04029* | (2016.01) |
| *H01M 8/0432* | (2016.01) |
| *H01M 8/04701* | (2016.01) |
| *H01M 8/04828* | (2016.01) |
| *H01M 8/04014* | (2016.01) |
| *H01M 8/04007* | (2016.01) |
| *H01M 8/04089* | (2016.01) |
| *H01M 8/04223* | (2016.01) |
| *H01M 8/04302* | (2016.01) |
| *H01M 8/04225* | (2016.01) |
| *H01M 8/1018* | (2016.01) |

(52) U.S. Cl.
CPC ..... *H01M 8/04067* (2013.01); *H01M 8/0485* (2013.01); *H01M 8/04097* (2013.01); *H01M 8/04225* (2016.02); *H01M 8/04253* (2013.01); *H01M 8/04268* (2013.01); *H01M 8/04302* (2016.02); *H01M 8/04328* (2013.01); *H01M 8/04343* (2013.01); *H01M 8/04708* (2013.01); *H01M 8/04731* (2013.01); *H01M 2008/1095* (2013.01)

(56) References Cited

FOREIGN PATENT DOCUMENTS

| | | |
|---|---|---|
| JP | 2009-181750 A | 8/2009 |
| JP | 2010-146751 A | 7/2010 |
| JP | 2012-156030 A | 8/2012 |

\* cited by examiner

FUEL CELL SYSTEM AND CONTROL METHOD FOR FUEL CELL SYSTEM

TECHNICAL FIELD

This invention relates to a fuel cell system for circulating anode gas discharged from a fuel cell to the fuel cell and a control method for fuel cell system.

BACKGROUND ART

JP2010-146751A discloses a fuel cell system with a heat exchanger configured to heat anode gas to be supplied to a fuel cell, utilizing cooling water increased in temperature by the fuel cell.

SUMMARY OF INVENTION

In a fuel cell system as described above, it is desirable to reduce a flow rate of cooling water circulated to a fuel cell to complete the warm-up of the fuel cell early when the fuel cell system is started in a sub-zero temperature environment.

However, if the flow rate of the cooling water is reduced, the amount of heat radiated to anode gas from the cooling water increased in temperature by the fuel cell decreases in a heat exchanger, wherefore a temperature increasing rate of the anode gas is slowed.

During sub-zero start, the temperature of the anode gas supplied from a tank may become lower than a freezing point and steam in anode off-gas may be frozen to form ice in a flow passage when the anode gas supplied from the tank and the anode off-gas discharged from the fuel cell join.

When the flow rate of the cooling water is reduced as described above in such a situation, the temperature increasing rate of the anode gas is slowed. Thus, ice formed in the flow passage increases and the flow passage may be closed.

The present invention was developed, focusing on such a problem, and aims to provide a fuel cell system for preventing the freezing of a component for circulating gas discharged from a fuel cell to the fuel cell while realizing early warm-up of the fuel cell and a control method for fuel cell system.

According to one aspect of the present invention, a fuel cell system supplies anode gas and cathode gas to a fuel cell and causes the fuel cell to generate power according to a load. The fuel cell system includes a gas supply passage configured to supply one of the anode gas and the cathode gas to the fuel cell, a refrigerant supply apparatus configured to supply refrigerant for cooling the fuel cell to the fuel cell, and a heat exchanger configured to exchange heat between the refrigerant increased in temperature by the fuel cell and the gas supplied to the gas supply passage. The fuel cell system includes a component provided in the gas supply passage and configured to circulate the one of the anode gas and the cathode gas discharged from the fuel cell to the fuel cell, and a warm-up control unit configured to control a flow rate of the refrigerant to a predetermined flow rate for warming up the fuel cell when the fuel cell is warmed up. The fuel cell system includes a gas temperature increase control unit configured to increase the flow rate of the refrigerant to be supplied to the heat exchanger on the basis of a temperature of the gas circulated by the component or a parameter related to the temperature when the flow rate of the refrigerant is controlled by the warm-up control unit.

DESCRIPTION OF EMBODIMENTS

Hereinafter, embodiments of the present invention are described with reference to the accompanying drawings.

(First Embodiment)

Figure 1:
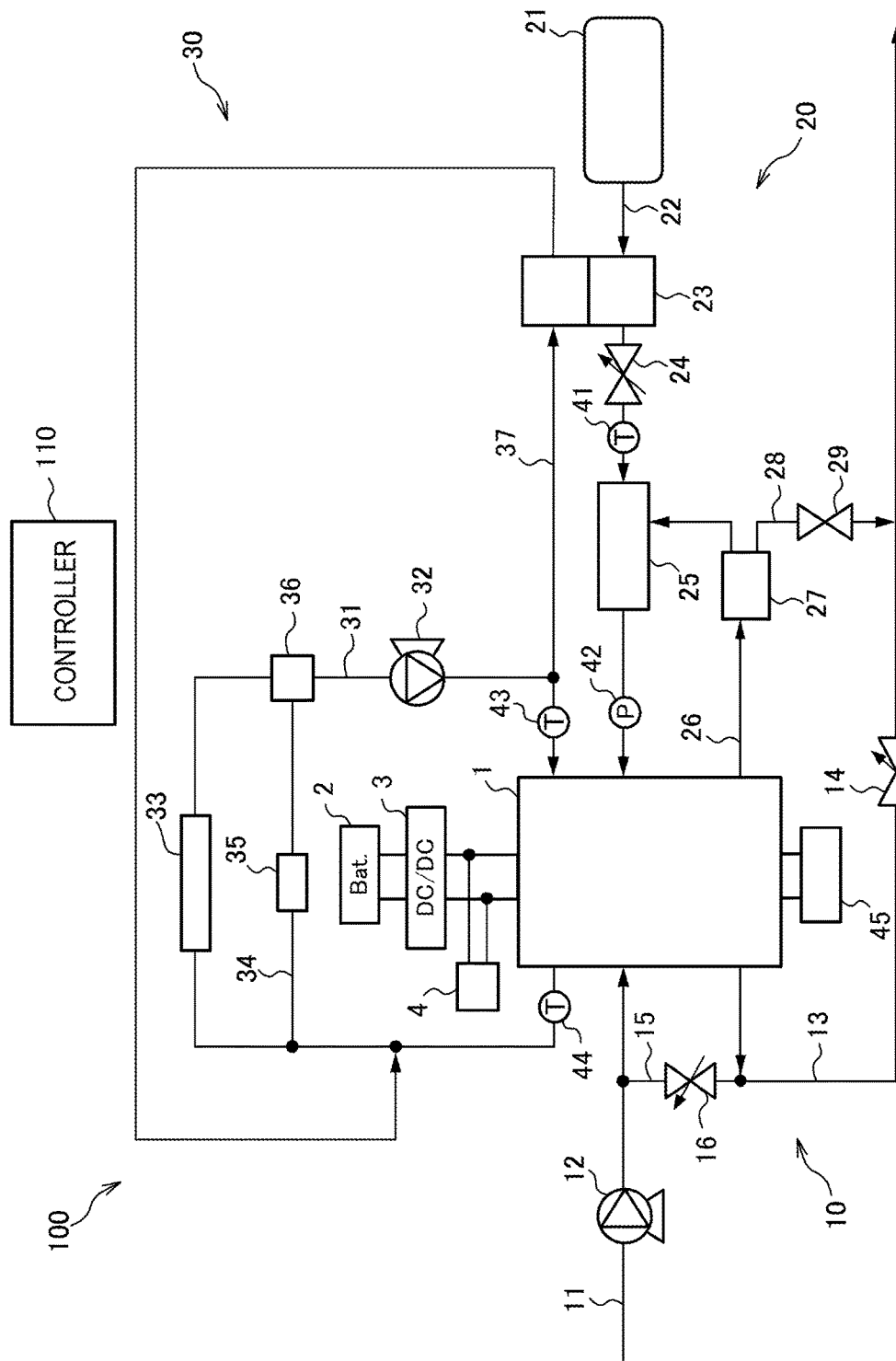
FIG. 1 is a diagram showing the configuration of a fuel cell system in a first embodiment of the present invention.

FIG. 1 is a diagram showing a configuration example of a fuel cell system in an embodiment of the present invention.

A fuel cell system 100 constitutes a power supply system for supplying fuel gas necessary for power generation from outside to a fuel cell and causing the fuel cell to generate power according to an electric load. The fuel cell system 100 is controlled by a controller 110.

The fuel cell system 100 includes a fuel cell stack 1, a battery 2, a DC/DC converter 3, electric loads 4, a cathode gas supplying/discharging device 10, an anode gas supplying/discharging device 20, a stack cooling device 30 and a stack resistance measuring device 45. Each of the cathode gas supplying/discharging device 10, the anode gas supplying/discharging device 20 and the stack cooling device 30 is an auxiliary machine for causing the fuel cell stack 1 to generate power.

The battery 2 is a power supply for assisting the fuel cell stack 1. The battery 2 outputs a voltage of, e.g. several hundreds of V.

The DC/DC converter 3 is a bidirectional voltage converter for adjusting a voltage of the fuel cell stack 1 and a voltage of the battery 2 with respect to each other. The DC/DC converter 3 is connected between the fuel cell stack 1 and the battery 2.

The DC/DC converter 3 is controlled by the controller 110 and adjusts the voltage of the fuel cell stack 1 using power output from the battery 2. For example, the DC/DC converter 3 reduces the voltage of the fuel cell stack 1 such that an output current taken out from the fuel cell stack 1 increases as required power required from the electric loads 4 increases.

The electric loads 4 are driven by power supplied from the fuel cell stack 1 and the battery 2. Examples of the electric loads 4 include an electric motor for driving a vehicle and some of auxiliary machines of the fuel cell stack 1.

In the present embodiment, the electric loads 4 are connected to a power supply line connecting the fuel cell stack 1 and the DC/DC converter 3. It should be noted that the electric motor may be connected to the power supply line between the fuel cell stack 1 and the DC/DC converter 3 and some of the auxiliary machines may be connected to the power supply line between the battery 2 and the DC/DC converter 3.

The fuel cell stack 1 is such that several hundreds of battery cells are laminated, and generates a DC voltage of, e.g. several hundreds of V (volts).

A fuel cell is composed of an anode electrode (fuel electrode), a cathode electrode (oxidant electrode) and an electrolyte membrane sandwiched between the anode electrode and the cathode electrode. In the fuel cell, anode gas (fuel gas) containing hydrogen in the anode electrode and cathode gas (oxidant gas) containing oxygen in the cathode electrode induce an electrochemical reaction (power generation reaction) in the electrolyte membrane. Specifically, the following electrochemical reactions proceed in both anode and cathode electrodes.

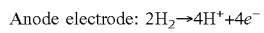

Anode electrode: $2H_2 \rightarrow 4H^+ + 4e^-$     (1)

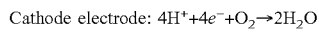

Cathode electrode: $4H^+ + 4e^- + O_2 \rightarrow 2H_2O$     (2)

By the above electrochemical reactions (1) and (2), an electromotive force is generated and water is generated. Since each of the fuel cells laminated in the fuel cell stack 1 is connected in series, a total of cell voltages generated in the fuel cells becomes an output voltage of the fuel cell stack 1.

The cathode gas is supplied to the fuel cell stack 1 from the cathode gas supplying/discharging device 10 and the anode gas is supplied thereto from the anode gas supplying/discharging device 20.

The cathode gas supplying/discharging device 10 is a device configured to supply the cathode gas to the fuel cell stack 1 and discharge cathode off-gas discharged from the fuel cell stack 1 to atmosphere. The cathode off-gas contains excess cathode gas not consumed by the fuel cell stack 1 and impurities such as generated water associated with power generation.

The cathode gas supplying/discharging device 10 includes a cathode gas supply passage 11, a compressor 12, a cathode gas discharge passage 13, a cathode pressure control value 14, a bypass passage 15 and a bypass valve 16.

The cathode gas supply passage 11 is a passage for supplying the cathode gas to the fuel cell stack 1. One end of the cathode gas supply passage 11 communicates with a passage for taking in air containing oxygen from outside air and the other end is connected to a cathode gas inlet hole of the fuel cell stack 1.

The compressor 12 is provided in the cathode gas supply passage 11. The compressor 12 takes air into the cathode gas supply passage 11 from outside air and supplies the air as the cathode gas to the fuel cell stack 1. The compressor 12 is controlled by the controller 110.

The cathode gas discharge passage 13 is a passage for discharging the cathode off-gas from the fuel cell stack 1. One end of the cathode gas discharge passage 13 is connected to a cathode gas outlet hole of the fuel cell stack 1 and the other end is open.

The cathode pressure control value 14 is provided in the cathode gas discharge passage 13. In the present embodiment, an electromagnetic valve capable of changing a valve opening degree in a stepwise manner is used as the cathode pressure control valve 14. The cathode pressure control value 14 is controlled to open and close by the controller 110. By this open/close control, a pressure of the cathode gas to be supplied to the fuel cell stack 1 is adjusted to a desired pressure.

The bypass passage 15 is a passage for directly discharging part of the cathode gas discharged from the compressor 12 to the cathode gas discharge passage 13 without supplying it to the fuel cell stack 1.

One end of the bypass passage 15 is connected to a part of the cathode gas supply passage 11 between the compressor 12 and the fuel cell stack 1 and the other end is connected to a part of the cathode gas discharge passage 13 upstream of the cathode pressure control value 14. Specifically, the bypass passage 15 is branched off from the cathode gas supply passage 11 at a position downstream of the compressor 12 and joins the cathode gas discharge passage 13 at a position upstream of the cathode pressure control valve 14.

The bypass valve 16 is provided in the bypass passage 15. In the present embodiment, an electromagnetic valve capable of changing a valve opening degree in a stepwise manner is used as the bypass valve 16. The bypass valve 16 is controlled by the controller 110.

The bypass valve 16 is opened, for example, when a flow rate of the cathode gas necessary to dilute hydrogen discharged from the fuel cell stack 1 (hereinafter, referred to as a "hydrogen dilution request flow rate") becomes larger than a flow rate of the cathode gas necessary for the fuel cell stack 1.

Alternatively, the bypass valve 16 is opened when a flow rate of the cathode gas necessary to avoid a surge occurring in the compressor 12 (hereinafter, referred to as a "surge avoidance request flow rate") becomes larger than the flow rate of the cathode gas necessary for the fuel cell stack 1.

It should be noted that the bypass valve 16 is closed when the flow rate of the cathode gas necessary for the fuel cell stack 1 is larger than the hydrogen dilution request flow rate, the surge avoidance request flow rate and the like.

The anode gas supplying/discharging device 20 supplies the anode gas to the fuel cell stack 1 and removes impurities in anode off-gas discharged from the fuel cell stack 1 while circulating the anode off-gas to the fuel cell stack 1. The impurities mean nitrogen in air permeating from the cathode electrodes to the anode electrodes via the electrolyte membranes, generated water associated with power generation and the like.

The anode gas supplying/discharging device 20 includes a high-pressure tank 21, an anode gas supply passage 22, a heat exchanger 23, an anode pressure control value 24, a jet pump 25, an anode gas circulation passage 26, a gas-liquid separation device 27, a purge passage 28 and a purge valve 29.

The high-pressure tank 21 stores the anode gas to be supplied to the fuel cell stack 1 in a high-pressure state.

The anode gas supply passage 22 is a passage for supplying the anode gas stored in the high-pressure tank 21 to the fuel cell stack 1. One end of the anode gas supply passage 22 is connected to the high-pressure tank 21 and the other end is connected to an anode gas inlet hole of the fuel cell stack 1.

The heat exchanger 23 is provided upstream of the anode pressure control valve 24 in the anode gas supply passage 22. The heat exchanger 23 exchanges heat between cooling water increased in temperature in the fuel cell stack 1 and the anode gas supplied from the high-pressure tank 21. The cooling water is refrigerant for cooling the fuel cell stack 1.

When the fuel cell system 100 is started at a low temperature, the heat exchanger 23 has a function of heating the anode gas to be supplied to the anode gas supply passage 22 by the cooling water warmed in the fuel cell stack 1.

The anode pressure control value 24 is provided between the heat exchanger 23 and the jet pump 25 in the anode gas supply passage 22. In the present embodiment, an electromagnetic valve capable of changing a valve opening degree in a stepwise manner is used as the anode pressure control valve 24. The anode pressure control value 24 is controlled to open and close by the controller 110. By this open/close control, a pressure of the anode gas to be supplied to the fuel cell stack 1 is adjusted.

A temperature sensor 41 configured to detect a temperature of the anode gas supplied from the high-pressure tank 21 (hereinafter, referred to as a "supplied gas temperature") is provided between the anode pressure control valve 24 and the jet pump 25 in the anode gas supply passage 22. The temperature sensor 41 supplies a detection signal indicating the detected temperature to the controller 110.

It should be noted that although the temperature sensor 41 is provided between the anode pressure control valve 24 and the jet pump 25 in the anode gas supply passage 22 in the present embodiment, it may be provided between the heat exchanger 23 and the anode pressure control valve 24 in the anode gas supply passage 22.

The jet pump 25 is provided between the anode pressure control valve 24 and the fuel cell stack 1 in the anode gas supply passage 22. The jet pump 25 is a pump or ejector for causing the anode gas circulation passage 26 to join the anode gas supply passage 22. By using the jet pump 25, the anode off-gas can be circulated to the fuel cell stack 1 by a simple configuration.

The jet pump 25 sucks the anode off-gas discharged from the fuel cell stack 1 and circulates that anode off-gas to the fuel cell stack 1 by increasing a flow velocity of the anode gas supplied by the anode pressure control valve 24.

The jet pump 25 is composed, for example, of a nozzle and a diffuser. The nozzle is for accelerating the flow velocity of the anode gas and injecting the anode gas to the diffuser. The nozzle is formed into a hollow cylindrical shape and an opening is narrowed toward a tip part of the nozzle. In this way, the flow velocity of the anode gas is increased in the tip part and the anode gas is injected into the diffuser.

The diffuser is for sucking the anode off-gas by the flow velocity of the anode gas injected from the nozzle. The diffuser causes the anode gas injected from the nozzle and the sucked anode off-gas to join and discharges gas after joining to the fuel cell stack 1.

The diffuser is formed with a confluent passage on the same axis as the nozzle. An opening of the confluent passage is formed to be wider toward a discharge port. The diffuser is formed with a hollow cylindrical suction chamber extending from a suction port to the tip part of the nozzle and the suction chamber and the confluent passage communicate.

A pressure sensor 42 is provided between the jet pump 25 and the fuel cell stack 1 in the anode gas supply passage 22. The pressure sensor 42 detects a pressure of the anode gas to be supplied to the fuel cell stack 1 (hereinafter, referred to as a "stack inlet gas pressure"). The pressure sensor 42 outputs a detection signal indicating the detected pressure to the controller 110.

The anode gas circulation passage 26 is a passage for circulating the anode off-gas discharged from the fuel cell stack 1 to the anode gas supply passage 22. One end of the anode gas circulation passage 26 is connected to an anode gas outlet hole of the fuel cell stack 1 and the other end joins a circulation port of the jet pump 25.

The liquid-gas separation device 27 is provided in the anode gas circulation passage 26. The liquid-gas separation device 27 separates impurities such as generated water and nitrogen gas in the anode off-gas from excess anode gas. The liquid-gas separation device 27 condenses steam contained in the anode off-gas into liquid water.

The anode gas having the impurities removed in the liquid-gas separation device 27 passes in the anode gas circulation passage 26 and is supplied to the anode gas supply passage 22 again via the jet pump 25. Further, a discharge hole for discharging the impurities to the purge passage 28 is formed in a lower part of the liquid-gas separation device 27.

The purge passage 28 is a passage for discharging the impurities separated by the liquid-gas separation device 27. One end of the purge passage 28 is connected to the discharge hole of the liquid-gas separation device 27 and the other end is connected to a part of the cathode gas discharge passage 13 downstream of the cathode pressure control valve 14.

The purge valve 29 is provided in the purge passage 28. The purge valve 29 is controlled to open and close by the controller 110. By this open/close control, the impurities such as nitrogen gas and liquid water are discharged to the cathode gas discharge passage 13.

The stack cooling device 30 is a device configured to adjust the fuel cell stack 1 to a temperature suitable for power generation, using the cooling water as refrigerant. The stack cooling device 30 includes a cooling water circulation passage 31, a cooling water pump 32, a radiator 33, a bypass passage 34, a hater 35, a thermostat 36, a branch passage 37, a stack inlet water temperature sensor 43 and a stack outlet water temperature sensor 44.

The cooling water circulation passage 31 is a passage for circulating the cooling water to the fuel cell stack 1. One end of the cooling water circulation passage 31 is connected to a cooling water inlet hole of the fuel cell stack 1 and the other end is connected to a cooling water outlet hole of the fuel cell stack 1.

The cooling water pump 32 is provided in the cooling water circulation passage 31. The cooling water pump 32 constitutes a refrigerant supply apparatus "refrigerant supply means" configured to supply the cooling water to the fuel cell stack 1. The cooling water pump 32 is controlled by the controller 110. It should be noted that, without limitation to the cooling water pump, a compressor may be used as the refrigerant supply apparatus configured to supply the cooling water to the fuel cell stack 1.

The radiator 33 is provided on the side of a cooling water suction port of the cooling water pump 32 in the cooling water circulation passage 31. The radiator 33 cools the cooling water heated by the fuel cell stack 1.

The bypass passage 34 is a passage bypassing the radiator 33. One end of the bypass passage 34 is connected to the cooling water circulation passage 31 on a cooling water outlet side of the fuel cell stack 1, and the other end is connected to the thermostat 36.

The heater 35 is provided in the bypass passage 34. The heater 35 is energized to heat the cooling water when the fuel cell stack 1 is warmed up. In the present embodiment, the heater 35 generates heat by having power supplied from the fuel cell stack 1 by the DC/DC converter 3.

The thermostat 36 is provided in a part where the bypass passage 34 joins the cooling water circulation passage 31. The thermostat 36 is a three-way valve. The thermostat 36 automatically opens and closes in response to the temperature of the cooling water flowing inside the thermostat 36.

For example, the thermostat 36 is closed and supplies only the cooling water flowing by way of the bypass passage 34 to the fuel cell stack 1 when the temperature of the cooling water is lower than a predetermined valve opening temperature. In this way, the cooling water having a higher temperature than the cooling water flowing by way of the radiator 33 flows into the fuel cell stack 1.

On the other hand, the thermostat 36 starts gradually opening when the temperature of the cooling water becomes equal to or higher than the valve opening temperature. Then, the thermostat 36 mixes the cooling water flowing by way of the bypass passage 34 and the cooling water flowing by way of the radiator 33 and supplies the mixed cooling water to the fuel cell stack 1. In this way, the cooling water having a lower temperature than the cooling water flowing by way of the bypass passage 34 flows into the fuel cell stack 1.

The branch passage 37 is branched off from the cooling water circulation passage 31 between the cooling water pump 32 and the cooling water inlet hole of the fuel cell stack 1, passes through the heat exchanger 23 and joins the cooling water circulation passage 31 at a position upstream of the bypass passage 34.

The stack inlet water temperature sensor 43 is provided near the cooling water inlet hole of the fuel cell stack 1 in the cooling water circulation passage 31. The stack inlet water temperature sensor 43 detects a temperature of the cooling water flowing into the fuel cell stack 1 (hereinafter, referred to as a "stack inlet water temperature"). The stack inlet water temperature sensor 43 outputs a detection signal indicating the detected temperature to the controller 110.

The stack outlet water temperature sensor 44 is provided near the cooling water outlet hole of the fuel cell stack 1 in the cooling water circulation passage 31. The stack outlet water temperature sensor 44 detects a temperature of the cooling water discharged the fuel cell stack 1 (hereinafter, referred to as a "stack outlet water temperature"). The stack outlet water temperature sensor 44 outputs a detection signal indicating the detected temperature to the controller 110.

The stack resistance measuring device 45 measures an internal resistance (HFR: High Frequency Resistance) of the fuel cell stack 1 to estimate a degree of wetness of the electrolyte membranes constituting the fuel cells laminated in the fuel cell stack 1. The smaller the degree of wetness of the electrolyte membranes, i.e. the less moisture in the electrolyte membranes and the drier the electrolyte membranes, the larger the internal resistance. On the other hand, the larger the degree of wetness of the electrolyte membranes, i.e. the more moisture in the electrolyte membranes and the wetter the electrolyte membranes, the smaller the internal resistance.

For example, the stack resistance measuring device 45 supplies an AC current to a positive electrode terminal of the fuel cell stack 1 and detects an AC voltage between the positive electrode terminal and a negative electrode terminal by the AC current. Then, the stack resistance measuring device 45 calculates the internal resistance by dividing an amplitude of the AC voltage by an amplitude of the AC current, and outputs a value of the internal resistance, i.e. HFR to the controller 110.

The controller 110 is configured by a microcomputer including a central processing unit (CPU), a read-only memory (ROM), a random access memory (RAM) and an input/output interface (I/O interface).

To the controller 110 are input detection values output from the temperature sensor 41, the pressure sensor 42, the stack inlet water temperature sensor 43, the stack outlet water temperature sensor 44 and the stack resistance measuring device 45.

The controller 110 controls the compressor 12, the cathode pressure control valve 14, the bypass valve 16, the anode pressure control valve 24 and the purge valve 29 on the basis of input values, required power required from the electric loads 4 and command values to the auxiliary machines. In this way, the cathode gas and the anode gas are supplied to the fuel cell stack 1 and a power generation state of the fuel cell stack 1 is satisfactorily maintained.

The controller 110 executes a control of warming up the fuel cell stack 1 to a temperature suitable for power generation (hereinafter, referred to as a "warm-up operation") when the fuel cell system 100 is started.

In the warm-up operation, the controller 110 electrically connects the fuel cell stack 1 to the auxiliary machines and causes the fuel cell stack 1 to generate power necessary to drive the auxiliary machines. Since the fuel cell stack 1 generates heat due to power generation, the fuel cell stack 1 itself is warmed. Power generated by the fuel cell stack 1 is supplied to the auxiliary machines such as the compressor 12, the cooling water pump 32 and the heater 35.

When such a fuel cell system is started in a sub-zero temperature environment and the warm-up operation is started, a temperature difference between the temperature of the cooling water flowing in the fuel cell stack 1 and that of the fuel cell stack 1 generating heat increases. If a flow rate of the cooling water to be supplied to the fuel cell stack 1 is increased by increasing a rotation speed of the cooling water pump 32 in this state, the amount of heat radiated from the fuel cell stack 1 to the cooling water increases and the temperature of the fuel cell stack 1 is less likely to increase. Thus, when the warm-up operation is started, it is desirable to suppress the rotation speed of the cooling water pump 32 low.

On the other hand, if the rotation speed of the cooling water pump 32 is suppressed low, a temperature increasing rate of the cooling water is slowed. Thus, the amount of heat radiated from the cooling water to the anode gas by the heat exchanger 23 decreases and the temperature increasing rate of the anode gas supplied from the heat exchanger 23 is slowed.

During sub-zero start, the temperature of the anode gas supplied from the high-pressure tank 21 to the jet pump 25 could also reach −30° C. If the anode off-gas is circulated to the fuel cell stack 1 by the jet pump 25 in such a situation, steam in the anode off-gas becomes liquid water and this liquid water is frozen to generate ice in a part where the anode gas and the anode off-gas join.

Thus, when the temperature of the anode gas to be supplied to the jet pump 25 increases at a slower rate, ice formed in the jet pump 25 increases to close the flow passage in the jet pump 25 and it may not be possible to supply the anode gas to the fuel cell stack 1.

Accordingly, in the present embodiment, the controller 110 predicts the freezing of the jet pump 25 and controls a flow rate of the cooling water to be supplied to the heat exchanger 23 when the fuel cell system 100 is started below a freezing point.

Figure 2:
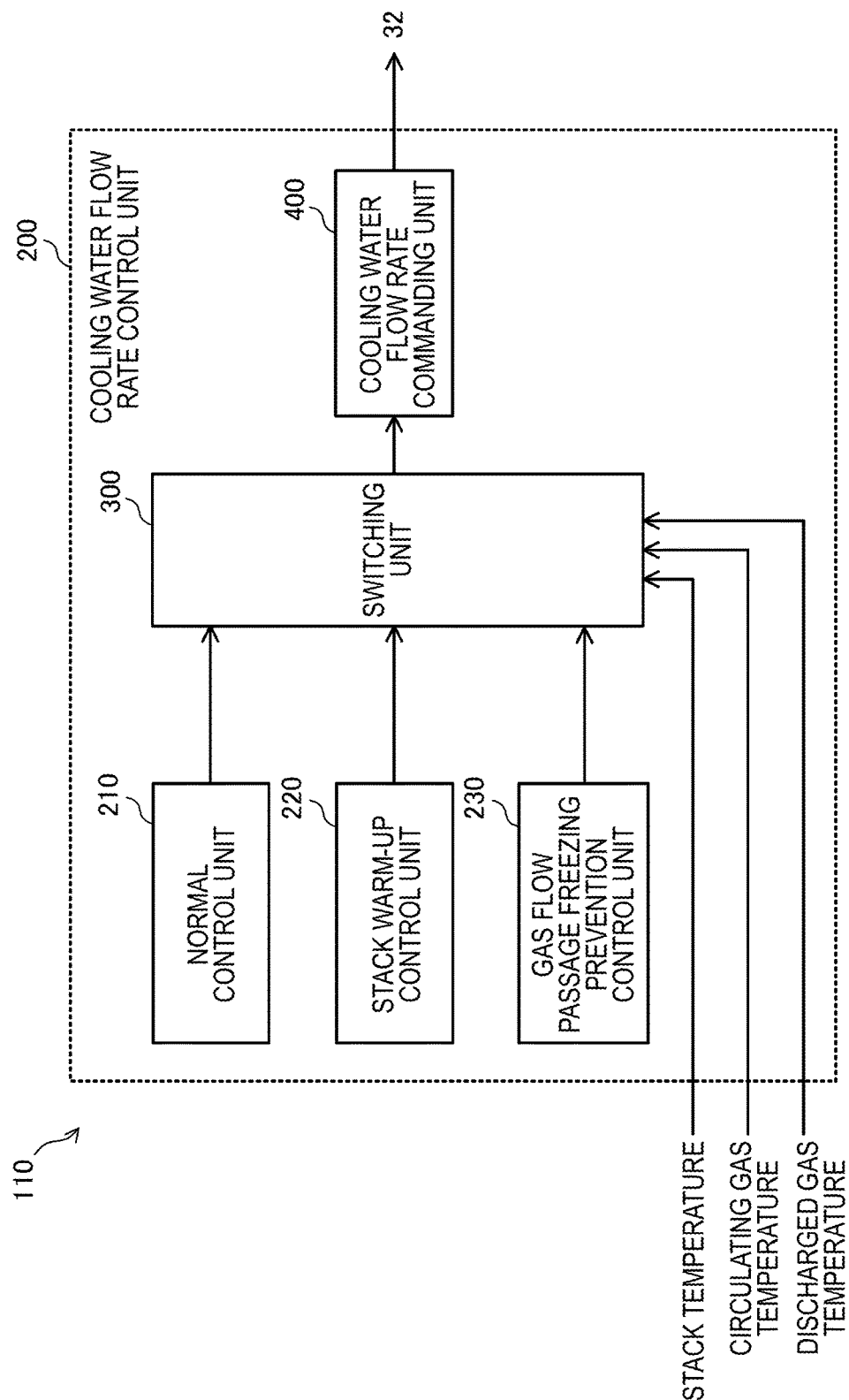
FIG. 2 is a block diagram showing a basic configuration of a controller configured to control the fuel cell system.

FIG. 2 is a block diagram showing a basic configuration of the controller 110 in the embodiment of the present invention.

The controller 110 includes a cooling water flow rate control unit 200 configured to control a flow rate of the cooling water to be circulated to the fuel cell stack 1 (hereinafter, referred to as a "cooling water flow rate").

The cooling water flow rate control unit 200 includes a normal control unit 210, a stack warm-up control unit 220, a gas flow passage freezing prevention control unit 230, a switching unit 300 and a cooling water flow rate commanding unit 400.

The normal control unit 210 controls the cooling water flow rate on the basis of the cooling water temperature of the fuel cell stack 1 such that the fuel cell stack 1 is maintained at a temperature suitable for power generation, e.g. 60° C. during a normal operation performed after the warm-up operation is completed. The normal control unit 210 increases the cooling water flow rate as the temperature of the fuel cell stack 1 increases due to power generation.

It should be noted that the normal control unit 210 may control the cooling water flow rate to maintain the electrolyte membranes in a wet/dry state determined in advance on the basis of the HFR of the fuel cell stack 1. For example, the normal control unit 210 increases the cooling water flow rate as the HFR increases. In this way, the temperature of the fuel cell stack 1 decreases and a flow rate of steam carried out from the fuel cell stack 1 by the cathode gas decreases, wherefore the electrolyte membranes are likely to become wet. In this case, the normal control unit 210 controls the cooling water flow rate on the basis of the larger one of a target flow rate based on the cooling water temperature and a target flow rate based on the HFR.

The stack warm-up control unit 220 constitutes a warm-up control unit configured to control the flow rate of the cooling water to be supplied to the fuel cell stack 1 to a flow rate determined in advance during the warm-up of the fuel cell stack 1.

The stack warm-up control unit 220 makes the cooling water flow rate lower than the flow rate set by the normal control unit 210 when the temperature of the fuel cell stack 1 (hereinafter, referred to as a "stack temperature") is lower than a warm-up completion temperature, e.g. 60° C. Since the heat of the fuel cell stack 1 generating heat is hard to be deprived of by the cooling water in this way, the warm-up of the fuel cell stack 1 is promoted.

A temperature of the cooling water correlated with the temperature of the fuel cell stack 1, e.g. an average value of the stack inlet water temperature and the stack outlet water temperature is used as the stack temperature in the present embodiment. It should be noted that a temperature sensor may be directly provided for the fuel cell stack 1 and a detection signal output from that temperature sensor may be used.

The gas flow passage freezing prevention control unit 230 controls the cooling water flow rate to prevent the freezing of the jet pump 25. The gas flow passage freezing prevention control unit 230 increases the flow rate of the cooling water to be supplied to the heat exchanger 23 when the cooling water flow rate is controlled by the stack warm-up control unit 220. Since the temperature increasing rate of the anode gas passing through the heat exchanger 23 is increased in this way, the anode gas temperature after joining can be caused to reach the freezing point early.

Specifically, the gas flow passage freezing prevention control unit 230 constitutes a gas temperature increase control unit configured to increase the temperature of the anode gas discharged from the jet pump 25.

The switching unit 300 determines on the basis of the stack temperature whether or not it is necessary to warm up the fuel cell stack 1. The switching unit 300 switches the control unit for controlling the cooling water flow rate from the normal control unit 210 to the stack warm-up control unit 220 when determining that the warm-up is necessary.

Further, the switching unit 300 predicts whether or not the jet pump 25 will be frozen, on the basis of the temperature of the anode off-gas before joining to be circulated from the fuel cell stack 1 to the jet pump 25 (hereinafter, referred to as a "circulating gas temperature").

The stack inlet water temperature corrected with the circulating gas temperature is, for example, used as the circulating gas temperature. It should be noted that a temperature sensor configured to detect the temperature of the anode off-gas may be provided in the anode gas circulation passage 26 and a detection signal output from that temperature sensor may be used.

The switching unit 300 switches the control unit for controlling the cooling water flow rate from the stack warm-up control unit 220 to the gas flow passage freezing prevention control unit 230 when predicting that the jet pump 25 will be frozen.

Furthermore, the switching unit 300 determines whether or not a state where ice will be generated in the jet pump 25 is set, on the basis of the temperature of the anode gas discharged from the jet pump 25 to the fuel cell stack 1 (hereinafter, referred to a "discharged gas temperature"). It should be noted that the discharged gas temperature is the temperature of post-joining gas after the circulating gas and the supplied gas are joined.

The discharged gas temperature is calculated on the basis of a target current, the circulating gas temperature and the supplied gas temperature. A calculation method of the discharged gas temperature is described in detail later with reference to FIG. 4. It should be noted that a temperature sensor may be provided between the jet pump 25 and the fuel cell stack 1 in the anode gas supply passage 22 and a detection signal output from that temperature sensor may be used.

The switching unit 300 switches the control unit for controlling the cooling water flow rate to the gas flow passage freezing prevention control unit 230 when determining the state where ice will be generated in the jet pump 25. On the other hand, the switching unit 300 switches the control unit for controlling the cooling water flow rate to the stack warm-up control unit 220 when determining a state where ice will not be generated in the jet pump 25.

The cooling water flow rate commanding unit 400 calculates a rotation speed of the cooling water pump 32 on the basis of the cooling water flow rate set by the normal control unit 210, the stack warm-up control unit 220 or the gas flow passage freezing prevention control unit 230 and outputs a command signal commanding that rotation speed to the cooling water pump 32.

Figure 3:
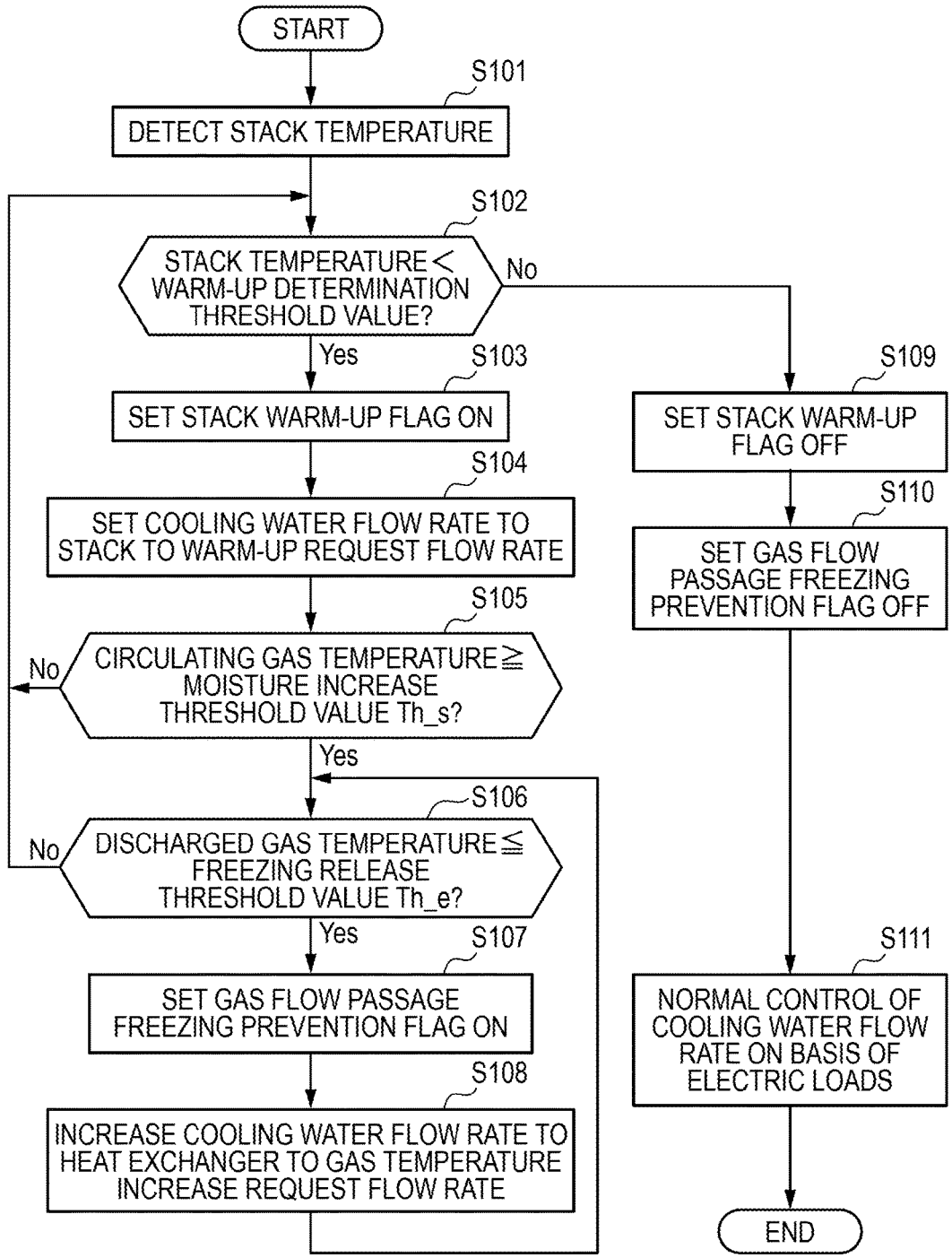
FIG. 3 is a flow chart showing an example of a control method for fuel cell system in the first embodiment.

FIG. 3 is a flow chart showing an example of a control method of the cooling water flow rate control unit 200 in the present embodiment.

In Step S101, the cooling water flow rate control unit 200 detects the stack temperature. Specifically, the cooling water flow rate control unit 200 calculates an average value of a detection value of the stack inlet water temperature sensor 43 and that of the stack outlet water temperature sensor 44 as the stack temperature.

In Step S102, the switching unit 300 judges whether or not the stack temperature is lower than a warm-up determination threshold value. The warm-up determination threshold value is set at the temperature suitable for the power generation of the fuel cell stack 1, e.g. 60° C.

In Step S103, the switching unit 300 sets a stack warm-up flag on if the stack temperature is lower than the warm-up determination threshold value.

In Step S104, the switching unit 300 controls the flow rate of the cooling water to be supplied to the fuel cell stack 1 to a warm-up request flow rate determined in advance if the stack warm-up flag is set on. Since a temperature difference between the fuel cell stack 1 generating heat and the cooling water increases if the fuel cell system 100 is started when the stack temperature is lower than 0° C., the warm-up request flow rate is set at a value smaller than the cooling water flow rate during a normal operation.

In Step S105, the switching unit 300 judges whether or not the circulating gas temperature is not lower than a moisture increase threshold value Th_s. The moisture increase threshold value Th_s is set on the basis of a temperature at which the amount of steam in the anode off-gas increases, e.g. set at 20° C.

If the circulating gas temperature is higher than the moisture increase threshold value Th_s, the switching unit 300 predicts that ice formed in the jet pump 25 will increase to close the flow passage (freezing).

In Step S106, the switching unit 300 judges whether or not the discharged gas temperature is not higher than a freezing release threshold value Th_e if the circulating gas temperature is not lower than the moisture increase threshold value Th_s. The freezing release threshold value Th_e is set at a value at which ice is generated in the jet pump 25, e.g. set at 0° C.

In Step S107, the switching unit 300 sets a gas flow passage freezing prevention flag on due to a possibility that the jet pump 25 will be frozen if the circulating gas temperature is not lower than the moisture increase threshold value Th_s and the discharged gas temperature is not higher than the freezing release threshold value Th_e.

In Step S108, the switching unit 300 switches the flow rate of the cooling water supplied from the cooling water pump 32 to the heat exchanger 23 to a gas temperature increase request flow rate if the gas flow passage freezing prevention flag is set on.

The gas temperature increase request flow rate is a flow rate determined to remove ice generated in the jet pump 25, and set at a value larger than the warm-up request flow rate. By setting the cooling water flow rate to the gas temperature increase request flow rate, the flow rate of the cooling water to be supplied to the heat exchanger 23 increases and the anode gas to be supplied to the jet pump 25 is heated in the heat exchanger 23, wherefore the discharged gas temperature increases at a faster rate.

Subsequently, the switching unit 300 returns to Step S106 and sets the cooling water flow rate higher than the warm-up request flow rate until the discharged gas temperature reaches the freezing release threshold value Th_e. A return is made to Step S102 when the discharged gas temperature exceeds the freezing release threshold value Th_e, and the switching unit 300 sets the cooling water flow rate back to the warm-up request flow rate unless the stack temperature is higher than the warm-up determination threshold value.

In Step S109, the switching unit 300 sets the stack warm-up flag off if the stack temperature is judged to be not lower than the warm-up determination threshold value in Step S102.

In Step S110, the switching unit 300 sets the stack warm-up flag off and sets the gas flow passage freezing prevention flag off.

In Step S111, the switching unit 300 switches to the normal control for controlling the cooling water flow rate on the basis of the electric loads 4 after the fuel cell stack 1 is warmed-up.

Figure 4:
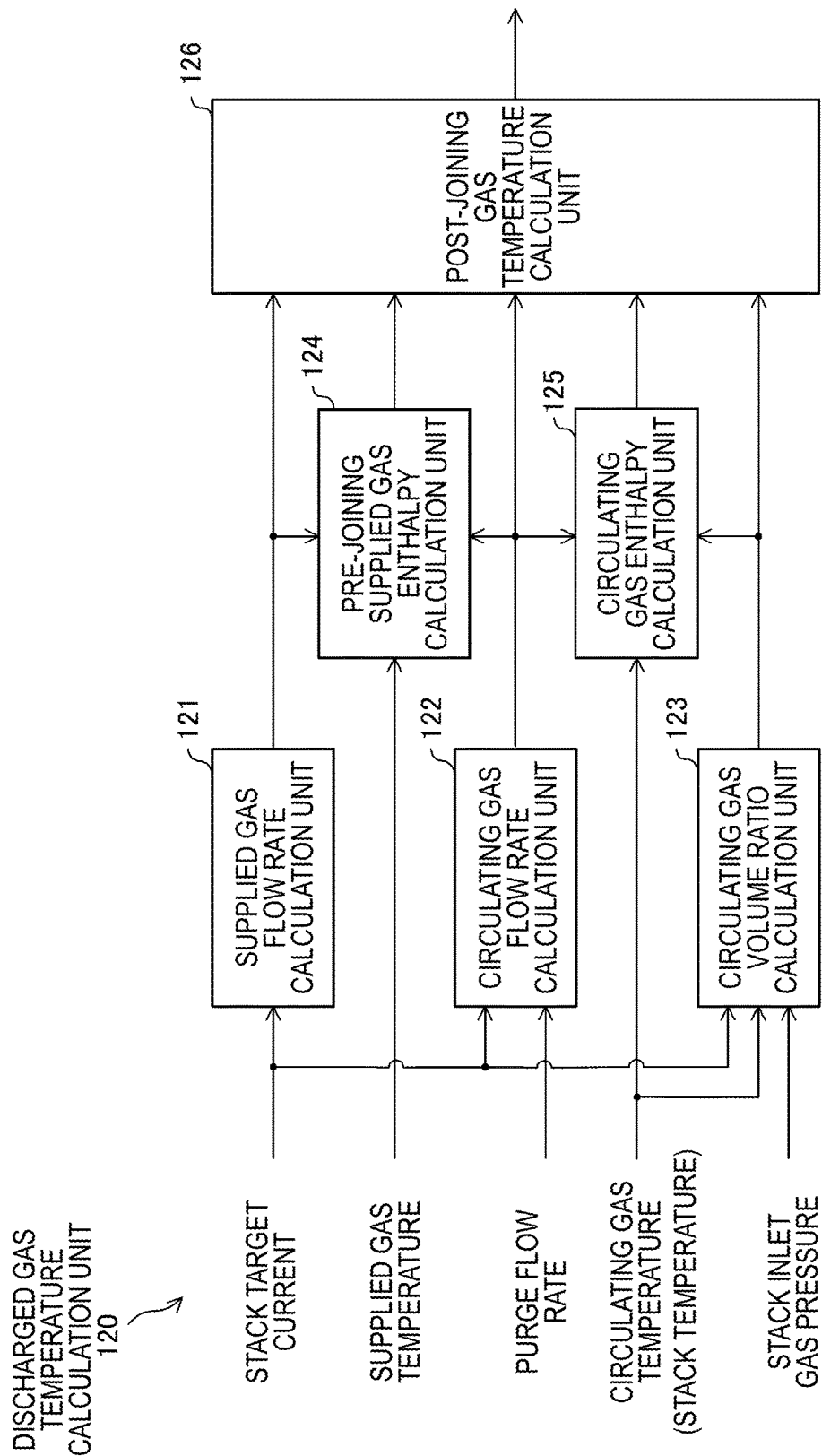
FIG. 4 is a block diagram showing a functional configuration for calculating a temperature of anode gas discharged from a jet pump in the controller.

FIG. 4 is a diagram showing a configuration example of a discharged gas temperature calculation unit 120 configured to calculate the discharged gas temperature in the controller 110.

The discharged gas temperature calculation unit 120 includes a supplied gas flow rate calculation unit 121, a circulating gas flow rate calculation unit 122, a circulating gas volume ratio calculation unit 123, a pre-joining supplied gas enthalpy calculation unit 124, a circulating gas enthalpy calculation unit 125 and a post-joining gas temperature calculation unit 126.

The supplied gas flow rate calculation unit 121 calculates a flow rate of the anode gas to be supplied to the fuel cell stack 1 (hereinafter, referred to as a "supplied gas flow rate") on the basis of the target current of the fuel cell stack 1. For example, the supplied gas flow rate calculation unit 121 calculates the supplied gas flow rate from a map determined in advance when receiving the target current.

The target current of the fuel cell stack 1 is calculated on the basis of power required from the electric loads 4 such as an electric motor or an auxiliary machine. For example, as a depressed amount of an accelerator pedal increases, power required from the electric motor increases, wherefore the target current increases.

The circulating gas flow rate calculation unit 122 calculates a circulating gas flow rate with reference to a map determined in advance on the basis of the target current of the fuel cell stack 1 and a purge flow rate. The purge flow rate is calculated on the basis of an opening degree of the purge valve 29 and the like.

The circulating gas volume ratio calculation unit 123 calculates a volume ratio of hydrogen gas, nitrogen gas and stream in the circulating gas.

Specifically, the circulating gas volume ratio calculation unit 123 calculates a stack outlet gas pressure by subtracting a pressure loss of the fuel cell stack 1 from a stack inlet gas pressure, and calculates a steam volume ratio by dividing the stack outlet gas pressure by a saturated stream pressure obtained from the circulating gas temperature. The stack temperature correlated with the circulating gas temperature is used as the circulating gas temperature in the present embodiment.

Further, the circulating gas volume ratio calculation unit 123 calculates a hydrogen gas volume ratio in the circulating gas from a map determined in advance on the basis of the target current. Then, the circulating gas volume ratio calculation unit 123 calculates a nitrogen gas volume ratio from the hydrogen gas volume ratio and the steam volume ratio in the circulating gas.

The pre-joining supply gas enthalpy calculation unit 124 calculates an enthalpy of the pre joining supplied gas from a predetermined mathematical formula or the like on the basis of a pre-joining supplied gas flow rate and the supplied gas temperature. A pre joining hydrogen flow rate is a value obtained by subtracting a hydrogen gas flow rate in the circulating gas from the supplied gas flow rate. The supplied gas temperature is the temperature of the anode gas to be supplied to the jet pump 25 and calculated on the basis of a detection signal output from the temperature sensor 41.

The circulating gas enthalpy calculation unit 125 calculates an enthalpy of the circulating gas from a predetermined mathematical formula or the like on the basis of the flow rate of each of the hydrogen gas, the nitrogen gas and the stream gas in the circulating gas and the circulating gas temperature.

The post-joining gas temperature calculation unit 126 calculates the temperature of the post-joining gas obtained by joining the pre joining supplied gas and the pre joining circulating gas in the jet pump 25.

Specifically, the post-joining gas temperature calculation unit 126 calculates a total enthalpy of the pre joining gas by adding the enthalpy of each of the pre joining supplied gas and the circulating gas. The post joining gas temperature calculation unit 126 integrates a heat capacity obtained by multiplying specific heat of the hydrogen gas by the pre joining supplied gas flow rate, a heat capacity obtained by multiplying a nitrogen gas flow rate in the circulating gas by specific heat of the nitrogen gas and a heat capacity obtained by multiplying a steam flow rate in the circulating gas by steam specific heat on the basis of the volume ratio of the circulating gas. The post-joining gas temperature calculation unit 126 calculates the gas temperature after joining by dividing the total enthalpy before joining by the integrated heat capacity.

According to the first embodiment of the present invention, the fuel cell system 100 includes the cooling water pump 32 configured to supply the cooling water (refrigerant) to the fuel cell stack 1 and the heat exchanger 23 configured to exchange heat between the cooling water increased in temperature in the fuel cell stack 1 and the anode gas flowing in the anode gas supply passage 22. Further, the fuel cell system 100 includes the jet pump 25 as a component for circulating the anode off-gas discharged from the fuel cell stack 1 to the fuel cell stack 1.

In such a fuel cell system, the stack warm-up control unit 220 controls the flow rate of the cooling water to be supplied to the fuel cell system 1 to the warm-up request flow rate determined in advance when the fuel cell stack 1 is warmed up, i.e. when the stack temperature is lower than the warm-up determination threshold value in the present embodiment. The warm-up request flow rate is set at the value smaller than the flow rate set by the normal control unit 210.

The gas flow passage freezing prevention control unit 230 increases the flow rate of the cooling water to be supplied to the heat exchanger 23 from the warm-up request flow rate on the basis of the cooling water temperature of the fuel cell stack 1 correlated with the temperature of the anode off-gas when the cooling water flow rate is controlled by the stack warm-up control unit 220.

Since the temperature increasing rate of the anode gas heated by the heat exchanger 23 is increased during the warm-up of the fuel cell stack 1 in this way, it is possible to reduce the amount of ice generated when the anode gas to be supplied from the heat exchanger 23 and the anode off-gas join.

Thus, it can be avoided that the gas flow passage is closed by ice generated during the warm-up of the fuel cell stack 1. Therefore, it is possible to prevent the freezing of the component for circulating the gas discharged from the fuel cell stack 1 while realizing early warm-up of the fuel cell stack 1.

It should be noted that although an example of increasing the flow rate of the cooling water to be supplied to the heat exchanger 23 from the warm-up request flow rate on the basis of the cooling water temperature of the fuel cell stack 1 has been described in the present embodiment, there is no limitation to this. For example, a temperature sensor may be provided in the anode gas circulation passage 26 and the cooling water to be supplied to the heat exchanger 23 may be increased from the warm-up request flow rate on the basis of a detection signal output from this temperature sensor.

In the present embodiment, the control unit configured to control the cooling water flow rate when the temperature of the anode off-gas (circulating gas temperature) exceeds the moisture increase threshold value Th_s is switched from the stack warm-up control unit 220 to the gas flow passage freezing prevention control unit 230. Then, the gas flow passage freezing prevention control unit 230 makes the flow rate of the cooling water to be supplied to the heat exchanger 23 higher than the warm-up request flow rate. The moisture increase threshold value Th_s is set at a temperature at which the amount of steam in the anode off-gas largely increases, i.e. at a temperature equal to or higher than 0° C.

Since the cooling water flow rate is not increased until the amount of stream in the anode off-gas increases in this way, an increase of power consumption of the cooling water pump 32 can be avoided while the warm-up of the fuel cell stack 1 is promoted.

It should be noted that although an example of using the jet pump 25 as a component for circulating the anode gas has been described in the present embodiment, a compressor, a pump or the like may be used. Further, although the fuel cell system 100 of the present embodiment is configured to circulate the anode off-gas to the fuel cell stack 1, effects and functions similar to those of the present embodiment can be obtained even if the cathode off-gas is circulated to the fuel cell stack 1.

As described above, the freezing of the gas flow passage can be prevented by increasing the cooling water flow rate on the basis of the temperature of the discharged gas during the warm-up in the fuel cell system for circulating at least one discharged gas, out of the anode off-gas and the cathode off-gas, to the fuel cell stack 1.

(Second Embodiment)

Figure 5:
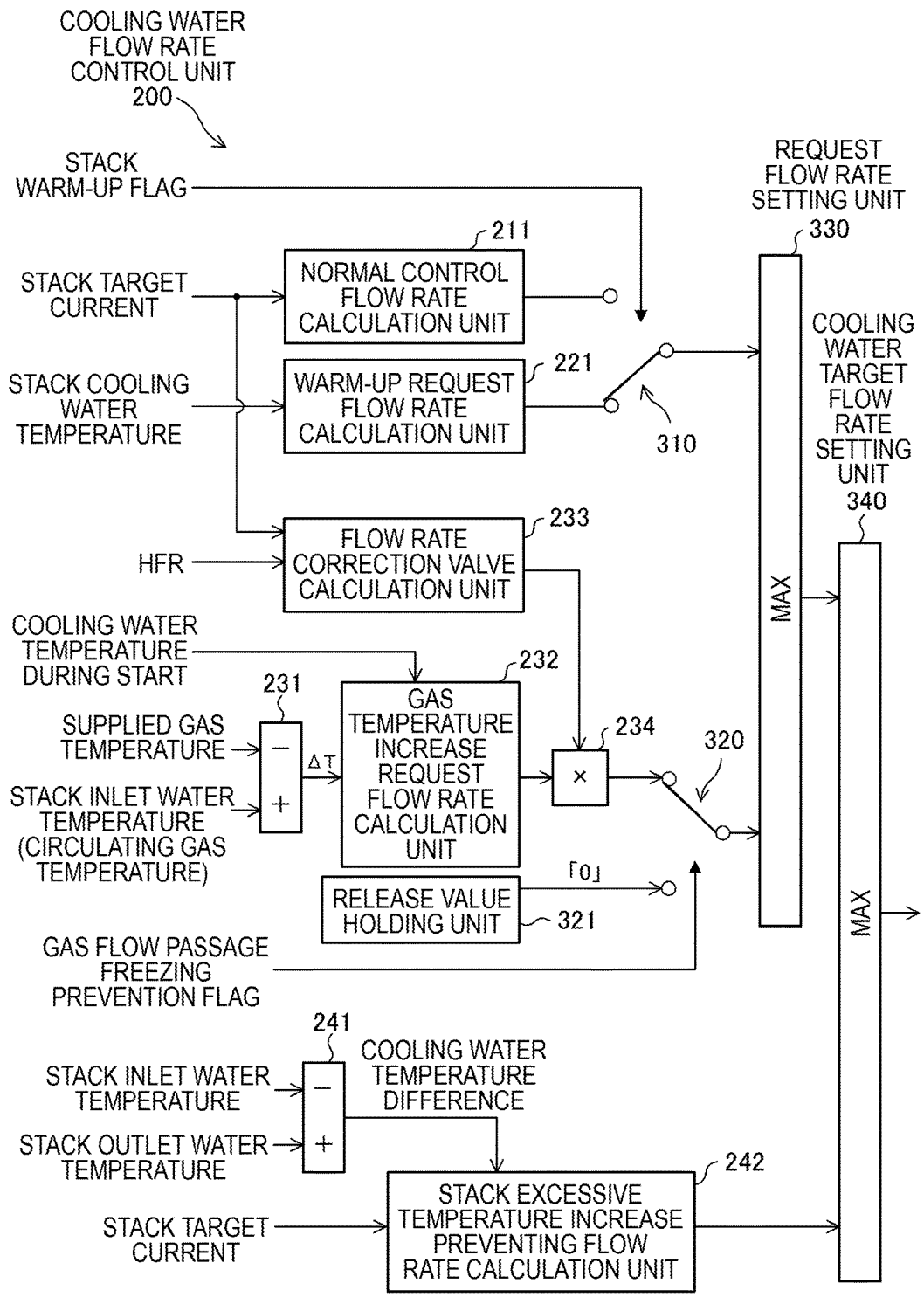
FIG. 5 is a block diagram showing the configuration of a cooling water flow rate control unit in a second embodiment of the present invention.

FIG. 5 is a block diagram showing a detailed configuration of a cooling water flow rate control unit 200 in a second embodiment of the present invention.

A fuel cell system of the present embodiment basically has the same configuration as the fuel cell system 100 shown in FIG. 1. In the following description, the same components as in the fuel cell system 100 are denoted by the same reference signs and not described.

The cooling water flow rate control unit 200 includes a normal control flow rate calculation unit 211, a warm-up request flow rate calculation unit 221, a subtractor 231, a gas temperature increase request flow rate calculation unit 232, a flow rate correction value calculation unit 233, a multiplier 234, a cooling water temperature difference calculation unit 241 and a stack excessive temperature increase preventing flow rate calculation unit 242. Further, the cooling water flow rate control unit 200 includes a switcher 310, a switcher 320, a release value holding unit 321, a request flow rate setting unit 330 and a cooling water target flow rate setting unit 340.

The normal control unit 211 calculates a cooling water flow rate for properly maintaining the temperature of a fuel cell stack 1 after the warm-up of the fuel cell stack 1 is completed (hereinafter, referred to as a "normal control flow rate"). The normal control flow rate calculation unit 211 increases a normal operation flow rate as a target current of the fuel cell stack 1 increases. It should be noted that the normal control flow rate calculation unit 211 constitutes a normal control unit 210 configured to control the cooling water flow rate on the basis of electric loads 4.

In the present embodiment, a normal operation map indicating a relationship between the target current of the fuel cell stack 1 and the normal operation flow rate is stored in advance in the normal control flow rate calculation unit 211. The normal control flow rate calculation unit 211 refers to this normal operation map and calculates the normal operation flow rate associated with the target current when obtaining the target current.

The warm-up request flow rate calculation unit 221 calculates a cooling water flow rate for warming up the fuel cell stack 1 (hereinafter, referred to as a "warm-up request flow rate"). The warm-up request flow rate is set at a value smaller than the normal control flow rate. Further, the warm-up request flow rate calculation unit 221 reduces the warm-up request flow rate as the temperature of the fuel cell stack 1 decreases.

In this way, the amount of heat radiated from the fuel cell stack 1 generating heat by power generation to the cooling water is suppressed as the temperature of the fuel cell stack 1 decreases. Thus, the warm-up of the fuel cell stack 1 can be promoted. It should be noted that the warm-up request flow rate calculation unit 221 constitutes a stack warm-up control unit 220 configured to make the cooling water flow rate smaller than the normal control flow rate when the fuel cell stack 1 is warmed up.

In the present embodiment, a warm-up operation map indicating a relationship between the cooling water temperature correlated with the temperature of the fuel cell stack 1 and the warm-up request flow rate is stored in advance in the warm-up request flow rate calculation unit 221. The warm-up request flow rate calculation unit 221 refers to the warm-up operation map and calculates the warm-up request flow rate associated with the cooling water temperature when obtaining the cooling water temperature.

The switcher 310 switches a value to be output to the request flow rate setting unit 330 to the normal control flow rate or the warm-up request flow rate according to a set state of a stack warm-up flag.

The switcher 310 outputs the warm-up request flow rate to the request flow rate setting unit 330 if the stack warm-up flag is set on in Step S103 shown in FIG. 3. On the other hand, the switcher 310 outputs the normal control flow rate to the request flow rate setting unit 330 if the stack warm-up flag is set off.

The subtractor 231 calculates a temperature difference ΔT by subtracting a supplied gas temperature from a stack inlet water temperature. The supplied gas temperature is a parameter correlated with a discharged gas temperature during sub-zero start and detected by a temperature sensor 41 shown in FIG. 1. It should be noted that the discharged gas temperature calculated by the discharged gas temperature calculation unit 120 shown in FIG. 4 may be used instead of the supplied gas temperature.

The stack inlet water temperature is a parameter correlated with the temperature of the anode off-gas (circulating gas temperature) and detected by the stack inlet water temperature sensor 43 shown in FIG. 1.

By using a detection value of the stack inlet water temperature sensor 43 instead of the temperature of the anode off-gas, it is not necessary to newly provide a temperature sensor in an anode gas circulation passage 26 and prepare a measure to prevent the freezing of that temperature sensor. Thus, an increase of manufacturing cost can be suppressed.

It should be noted that the fuel cell stack 1 is assumed to be a counter-flow type fuel cell stack formed such that an anode gas outlet hole and a cooling water inlet hole are adjacent in the present embodiment. In contrast, in the case of using a fuel cell stack formed such that an anode gas outlet hole and a cooling water outlet hole are adjacent, it is desirable to use a stack outlet water temperature instead of the stack inlet water temperature. Further, a temperature sensor may be provided in the anode gas circulation passage 26 and a detection signal output from that temperature sensor may be used.

The gas temperature increase request flow rate calculation unit 232 calculates a cooling water flow rate for more quickly increasing the temperature of the anode gas warmed by the heat exchanger 23 than during the warm-up operation (hereinafter, referred to as a "gas temperature increase request flow rate"). The gas temperature increase request flow rate is set at a value larger than the warm-up request flow rate.

The gas temperature increase request flow rate calculation unit 232 increases the gas temperature increase request flow rate since an effect of increasing the temperature of the anode gas increases by increasing the cooling water flow rate as the temperature difference ΔT between the stack inlet water temperature and the supplied gas temperature increases.

Further, the gas temperature increase request flow rate calculation unit 232 increases the gas temperature increase request flow rate as the cooling water temperature when the fuel cell system 100 is started decreases since a longer time is required to increase the discharged gas temperature to the freezing point. By increasing the gas temperature increase request flow rate, a temperature increasing time is shortened. Thus, the closure of the flow passage by ice generated in a jet pump 25 can be suppressed.

It should be noted that the gas temperature increase request flow rate calculation unit 232 constitutes a gas flow passage freezing prevention control unit 230 configured to make the cooling water flow rate higher than the warm-up request flow rate on the basis of the temperature of the anode off-gas.

In the present embodiment, a freezing prevention control map indicating a relationship between the temperature difference ΔT and the gas temperature increase request flow rate is stored in advance in the gas temperature increase request flow rate calculation unit 232. The freezing prevention control map is described later with reference to FIG. 6.

The gas temperature increase request flow rate calculation unit 232 refers to the freezing prevention control map and calculates the gas temperature increase request flow rate associated with the temperature difference ΔT at the cooling water temperature during the start when obtaining the cooling water temperature and the temperature difference ΔT during the start. The gas temperature increase request flow rate calculation unit 232 outputs that gas temperature increase request flow rate to the multiplier 234.

The flow rate correction value calculation unit 233 calculates a correction value for correcting the gas temperature increase request flow rate. The flow rate correction value calculation unit 233 calculates the correction value on the basis of the target current and HFR of the fuel cell stack 1.

For example, the flow rate correction value calculation unit 233 increases the correction value to increase the gas temperature increase request flow rate as the target current increases since the cooling water temperature increases and an effect of increasing the temperature of the anode gas increases.

Further, the flow rate correction value calculation unit 233 increases the correction value to increase the gas temperature increase request flow rate since the amount of steam contained in the anode off-gas increases as the HFR decreases.

In the present embodiment, a correction map indicating a relationship between the target current and the gas temperature increase request flow rate for each HFR is stored in advance in the flow rate correction value calculation unit 233. The correction map is described with reference to FIG. 7 later.

When obtaining the target current and the HFR, the flow rate correction value calculation unit 233 refers to the correction map specified by that HFR and calculates a correction value associated with that target current. The flow rate correction value calculation unit 233 outputs that correction value to the multiplier 234.

The multiplier 234 corrects the gas temperature increase request flow rate by multiplying the gas temperature increase request flow rate by the correction value. The multiplier 234 outputs the corrected gas temperature increase request flow rate to the switcher 320.

The release value holding unit 321 holds zero as a value for releasing a freezing prevention control.

The switcher 320 switches a value to be output to the request flow rate setting unit 330 to the corrected gas temperature increase request flow rate or zero according to a set state of a gas flow passage freezing prevention flag.

The switcher 320 outputs the gas temperature increase request flow rate to the request flow rate setting unit 330 if the gas flow passage freezing prevention flag is set on in Step S107 shown in FIG. 3. On the other hand, the switcher 320 outputs zero to the request flow rate setting unit 330 to release the freezing prevention control if the gas flow passage freezing prevention flag is set off.

The request flow rate setting unit 330 sets the larger one of the normal control flow rate or the warm-up request flow rate output from the switcher 310 and the gas temperature increase request flow rate or zero output from the switcher 320 as the request flow rate and outputs that request flow rate to the cooling water target flow rate setting unit 340.

For example, the request flow rate setting unit 330 outputs the warm-up request flow rate as the request flow rate of the cooling water if the stack warm-up flag is set on with the gas flow passage freezing prevention flag set off. When the gas flow passage freezing prevention flag is switched on with the stack warm-up flag set on, the request flow rate setting unit 330 outputs the gas temperature increase request flow rate larger than the warm-up request flow rate.

Since the flow rate of the cooling water to be supplied to the heat exchanger 23 increases in this way, the amount of heat radiated to the anode gas passing through the heat exchanger 23 increases and a temperature increasing time until the discharged gas temperature of the anode gas discharged from the jet pump 25 reaches a freezing point can be shortened. Thus, the closure of the flow passage by ice formed in the jet pump 25 can be avoided.

Further, since the gas flow passage freezing prevention flag is set off when the discharged gas temperature exceeds a freezing release threshold value Th_e, the request flow rate setting unit 330 switches the request flow rate of the cooling water from the gas temperature increase request flow rate to the warm-up request flow rate.

In this way, the power consumption of the cooling water pump 32 can be prevented from being unnecessarily increased by increasing the cooling water flow rate in a state where the jet pump 25 will not be frozen.

The cooling water temperature difference calculation unit 241 calculates the cooling water temperature difference between the inlet and outlet of the fuel cell stack 1 by subtracting the stack inlet water temperature from the stack outlet water temperature and outputs that cooling water temperature difference to the stack excessive temperature increase preventing flow rate calculation unit 242.

The stack excessive temperature increase preventing flow rate calculation unit 242 calculates a cooling water flow rate for preventing the temperature of the fuel cell stack 1 from becoming excessively high when the fuel cell system 100 is started (hereinafter, referred to as an "excessive temperature increase preventing flow rate"). The excessive temperature increase preventing flow rate during a start-up processing is set at a value smaller than the normal control flow rate.

The stack excessive temperature increase preventing flow rate calculation unit 242 increases the excessive temperature increase freezing prevention as the target current of the fuel cell stack 1 increases since the amount of generated heat associated with the power generation of the fuel cell stack 1 increases. Further, the stack excessive temperature increase preventing flow rate calculation unit 242 increases the excessive temperature increase preventing flow rate to lower the temperature on the outlet side of the fuel cell stack 1 to the temperature on the inlet side as the cooling water temperature difference increases.

In the present embodiment, an excessive temperature increase prevention map indicating a relationship between the target current and the excessive temperature increase preventing flow rate for each cooling water temperature difference is stored in advance in the stack excessive temperature increase preventing flow rate calculation unit 242. The excessive temperature increase prevention map is described later with reference to FIG. 8.

The stack excessive temperature increase preventing flow rate calculation unit 242 refers to the excessive temperature increase prevention map specified by the cooling water temperature difference and calculates the excessive temperature increase preventing flow rate associated with the target current when obtaining the cooling water temperature difference and the target current. The stack excessive temperature increase preventing flow rate calculation unit 242 outputs that excessive temperature increase preventing flow rate to the cooling water target flow rate setting unit 340.

The cooling water target flow rate setting unit 340 sets the larger one of the excessive temperature increase preventing flow rate and the value output from the request flow rate setting unit 330 as the cooling water target flow rate.

For example, when the excessive temperature increase preventing flow rate becomes larger than the warm-up request flow rate in the case where the stack warm-up flag is set on, the cooling water target flow rate setting unit 340 sets the excessive temperature increase freezing prevention as the cooling water target flow rate. In this way, the temperature of the fuel cell stack 1 can be prevented from becoming excessively high by the warm-up request flow rate.

Figure 6:
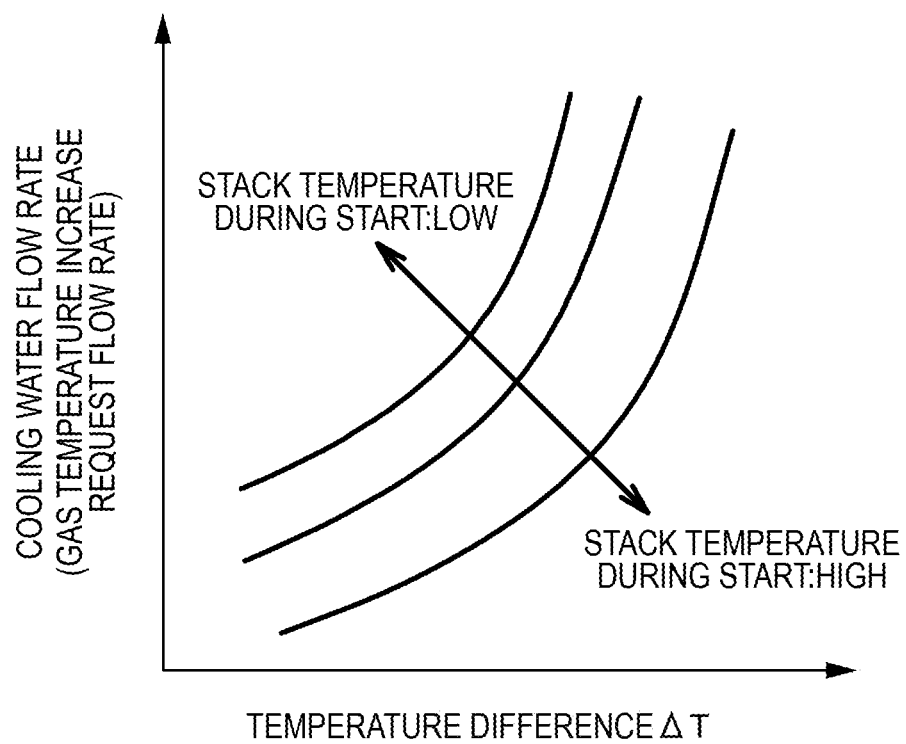
FIG. 6 is a graph showing a freezing prevention control map determined to prevent the freezing of a gas flow passage.

FIG. 6 is a graph showing an example of the freezing prevention control map stored in the gas temperature increase request flow rate calculation unit 232.

As shown in FIG. 6, the temperature difference $\Delta T$ calculated by the subtractor 231 and the gas temperature increase request flow rate are associated with each other for each cooling water temperature during the start in the freezing prevention control map. The temperature difference $\Delta T$ is a difference between the temperature of the gas supplied from the heat exchanger 23 to the jet pump 25 and that of the gas circulated from the fuel cell stack 1 to the jet pump 25.

In the freezing prevention control map, the cooling water flow rate increases as the temperature difference $\Delta T$ increases. This is because the amount of heat radiated from the cooling water to the anode gas increases by increasing the cooling water flow rate as the temperature difference between the anode gas and the cooling water increases in the heat exchanger 23.

Further, at the same temperature difference $\Delta T$, the gas temperature increase request flow rate increases as the cooling water temperature during the start decreases. This is to suppress a situation where an increase width of the anode gas temperature to the freezing release threshold value Th_e increases and the temperature increasing time becomes longer as the cooling water temperature during the system start decreases.

Figure 7:
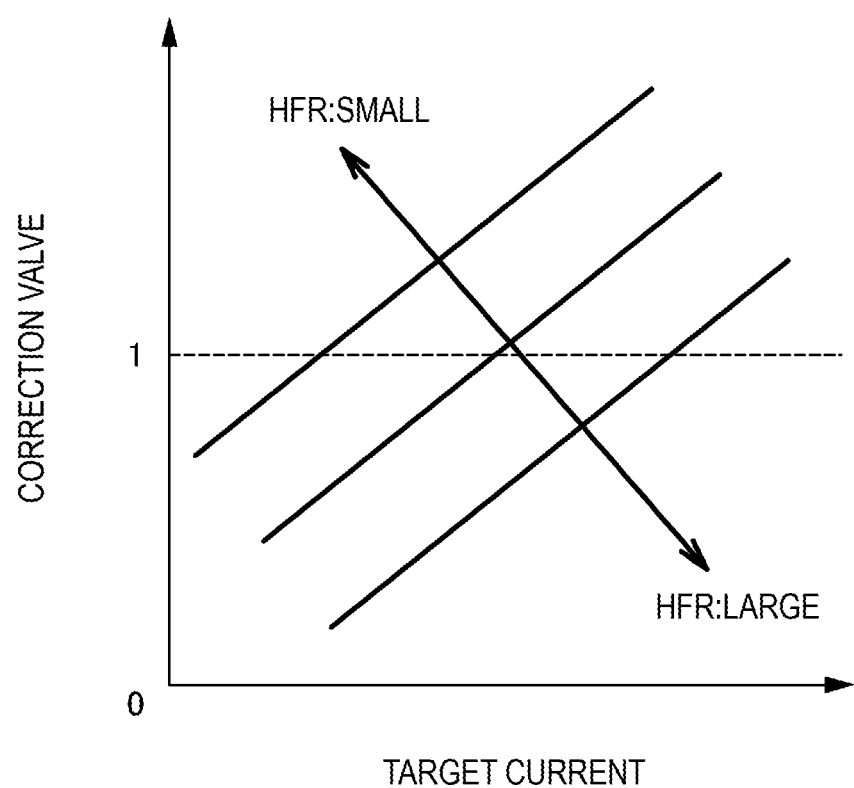
FIG. 7 is a graph showing a correction map for correcting a cooling water flow rate obtained by the freezing prevention control map.

FIG. 7 is a graph showing an example of the correction map stored in the flow rate correction value calculation unit 233.

As shown in FIG. 7, the target current and the correction value are associated with each other for each HFR of the fuel cell stack 1 in the correction map.

In the correction map, as the target current increases, the correction value increases to increase the gas temperature increase request flow rate. This is because the temperature of the anode gas is likely to increase by increasing the flow rate of the cooling water to be supplied to the heat exchanger 23 as the target current increases since the cooling water temperature increases due to the heat generation of the fuel cell stack 1 and the temperature difference $\Delta T$ becomes larger.

Further, at the same target current, the correction value decreases to decrease the gas temperature increase request flow rate as the HFR increases. This is because an increasing amount of ice generated in the jet pump 25 decreases since the amount of steam in the anode off-gas to be sucked into the jet pump 25 decreases as the HFR increases, i.e. as the fuel cells become drier.

Figure 8:
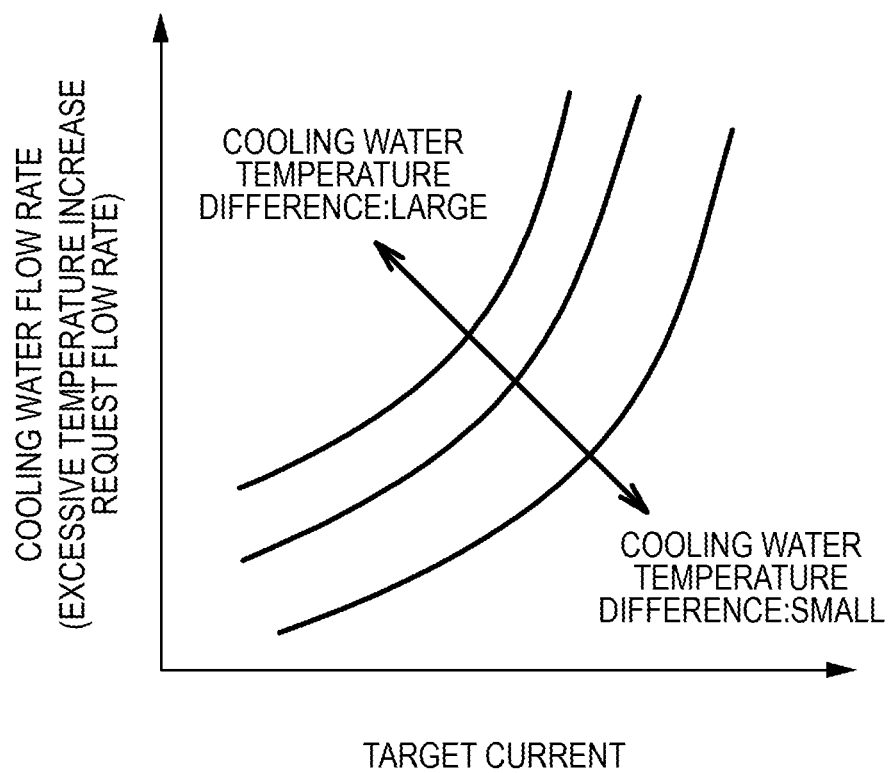
FIG. 8 is a graph showing an excessive temperature increase prevention map for preventing the temperature of a fuel cell stack from excessively increasing during a start-up processing of the fuel cell system, FIG. 9 are time charts showing a control technique of the cooling water flow rate in the second embodiment, FIG. 10 are time charts showing the control technique of the cooling water flow rate when a temperature difference between supplied gas to be supplied to a jet pump and circulating gas becomes small.

FIG. 8 is a graph showing an example of the excessive temperature increase prevention map stored in the stack excessive temperature increase preventing flow rate calculation unit 242.

As shown in FIG. 8, the target current of the fuel cell stack 1 and the excessive temperature increase preventing flow rate are associated with each other for each cooling water temperature difference in the excessive temperature increase prevention.

In the excessive temperature increase prevention map, the excessive temperature increase preventing flow rate increases as the target current increases. This is to suppress a sudden temperature increase of the fuel cell stack 1 since the amount of heat generation of the fuel cell stack 1 increases as the target current increases.

Further, at the same target current, the gas temperature increase request flow rate increases as the cooling water temperature difference increases. This is to reduce the temperature on the outlet side of the fuel cell stack 1 as the cooling water temperature difference increases since the fuel cells cannot be cooled on the outlet side of the fuel cell stack 1 as much as on the inlet side.

Next, the operation of the cooling water flow rate control unit 200 in the present embodiment is described with reference to FIGS. 9 and 10.

Figure 9:
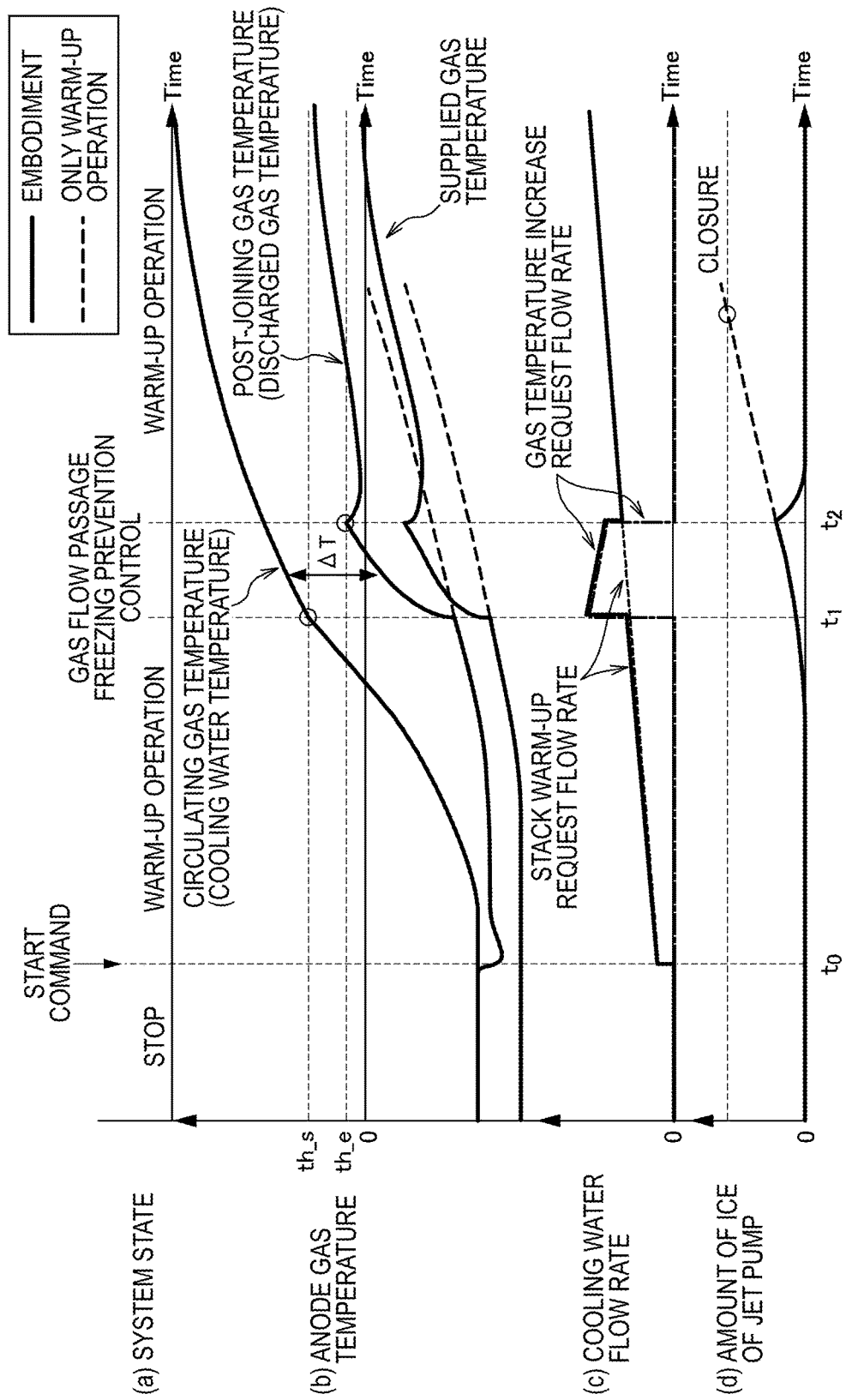

FIG. 9 are time charts when the freezing prevention control of the jet pump 25 is executed by the cooling water flow rate control unit 200.

FIG. 9(*a*) is a chart showing a change of an operating state of the fuel cell system 100. FIG. 9(*b*) is a chart showing a change of each of the temperature of the anode off-gas before joining to be sucked into the jet pump 25 (circulating gas temperature), the temperature of the anode gas before joining to be supplied to the jet pump 25 (supplied gas temperature) and the temperature of the anode gas after the supplied gas and the circulating gas before joining are joined in the jet pump 25 (post-joining gas temperature).

Here, a change of the cooling water temperature is shown as the circulating gas temperature before joining. It should be noted that the cooling water temperature is the temperature of the cooling water detected by the stack inlet water temperature sensor 43 and the supplied gas temperature is the temperature of the anode gas detected by the temperature sensor 41. The post joining gas temperature is the temperature of the anode gas after joining discharged from the jet pump 25.

FIG. 9(*c*) is a chart showing a change of the flow rate of the cooling water discharged from the cooling water pump 32. In FIG. 9(*c*), the warm-up request flow rate is shown by a broken line and the gas temperature increase request flow rate is shown by a dashed-dotted line. FIG. 9(*d*) is a chart showing a change of the amount of ice formed in the jet pump 25.

A horizontal axis of each of FIGS. 9(*a*) to 9(*d*) is a time axis common to each other. Further, in FIGS. 9(*b*) and 9(*d*), changes when only the warm-up operation is performed without executing the gas flow passage freezing prevention control are shown by broken lines.

Before time t0, the fuel cell system 100 is in a stopped state as shown in FIG. 9(*a*), the cooling water temperature is a temperature much lower than 0° C., e.g. −20° C. and the supplied gas temperature is a temperature even lower than the cooling water temperature, e.g. −30° C.

At time t0, the fuel cell system 100 is started and the stack warm-up flag is set on and the warm-up operation is performed since the cooling water temperature is lower than the warm-up determination threshold value.

In the warm-up operation, the controller 110 supplies generated power from the fuel cell stack 1 to the auxiliary machines such as the compressor 12, the cooling water pump 32 and the heater 35 and warms up the fuel cell stack 1 by self-heat generation associated with the power generation of the fuel cell stack 1 and heat radiation by the heater 35. In this way, the cooling water temperature gradually increases as shown in FIG. 9(*b*).

At this time, as shown in FIG. 9(*c*), the cooling water flow rate control unit 200 sets the flow rate of the cooling water discharged from the cooling water pump 32 as the warm-up request flow rate. Since the cooling water temperature increases according to the passage of time, the cooling water flow rate control unit 200 monotonously increases the warm-up request flow rate with the passage of time. It should be noted that the cooling water flow rate control unit 200 may increase the warm-up request flow rate according to a change of the cooling water temperature.

At time t1, the cooling water temperature exceeds the moisture increase threshold value Th_s as shown in FIG. 9(*b*). Thus, the gas flow passage freezing prevention flag is set on. Associated with this, the cooling water flow rate control unit 200 increases the cooling water flow rate from the warm-up request flow rate to the gas temperature increase request flow rate as shown in FIG. 9(*c*).

Since the flow rate of the cooling water to be supplied to the heat exchanger 23 increases as shown in FIG. 9(*b*), the anode gas temperature before joining increases at a faster rate as compared to the case where only the warm-up operation is performed, whereby the anode gas temperature after joining also increases at a faster rate.

By setting the warm-up request flow rate until a timing at which ice in the jet pump 25 increases as shown in FIG. 9(*d*), the warm-up time of the fuel cell stack 1 can be ensured to be long and an unnecessary increase of the cooling water flow rate can be avoided.

Since the temperature difference $\Delta T$ between the circulating gas temperature and the discharged gas temperature, i.e. a temperature difference between the circulating gas temperature and the supplied gas temperature becomes smaller as time passes from time t1, a temperature increasing effect of the anode gas by an increase of the cooling water flow rate becomes smaller. Thus, the cooling water flow rate control unit 200 reduces the gas temperature increase request flow rate as shown in FIG. 9(*c*).

In this way, it can be prevented that the cooling water flow rate is increased more than necessary in a situation where such an increase does not contribute to increases of the supplied gas temperature and the discharged gas temperature. Therefore, the power consumption of the cooling water pump 32 can be reduced and the warm-up of the fuel cell stack 1 can be promoted by lowering the cooling water flow rate.

After time t2, the anode gas temperature after joining exceeds the freezing release threshold value Th_e as shown in FIG. 9(*b*). Thus, the gas flow passage freezing prevention flag is switched off. Associated with this, the cooling water flow rate control unit 200 switches the cooling water flow rate from the gas temperature increase request flow rate to the warm-up request flow rate as shown in FIG. 9(*c*). In this way, the warm-up of the fuel cell stack 1 is promoted.

Associated with this, the anode gas temperature after joining temporarily decreases as shown in FIG. 9(*b*), but increases again without decreasing to 0° C. (freezing point temperature). By setting the freezing release threshold value Th_e higher than 0° C. in this way, the jet pump 25 can be prevented from being frozen after a switch to the warm-up request flow rate.

Further, since the anode gas temperature after joining is maintained to be higher than 0° C., ice formed in the jet pump 25 immediately melts as shown in FIG. 9(*d*).

By executing the gas flow passage freezing prevention control at the timing at which the amount of steam in the circulating gas starts increasing in this way, an execution time of the gas flow passage freezing prevention control (t1-t2) can be shortened and a loner time can be ensured for the warm-up operation. Therefore, it is possible to suppress an increase of the power consumption of the cooling water pump 32 and promote the warm-up of the fuel cell stack 1.

It should be noted that an example of reducing the temperature difference $\Delta T$ between the circulating gas temperature and the discharged gas temperature is shown in FIG. 9. An example of increasing the temperature difference $\Delta T$ is briefly described with reference to FIG. 10.

Figure 10:
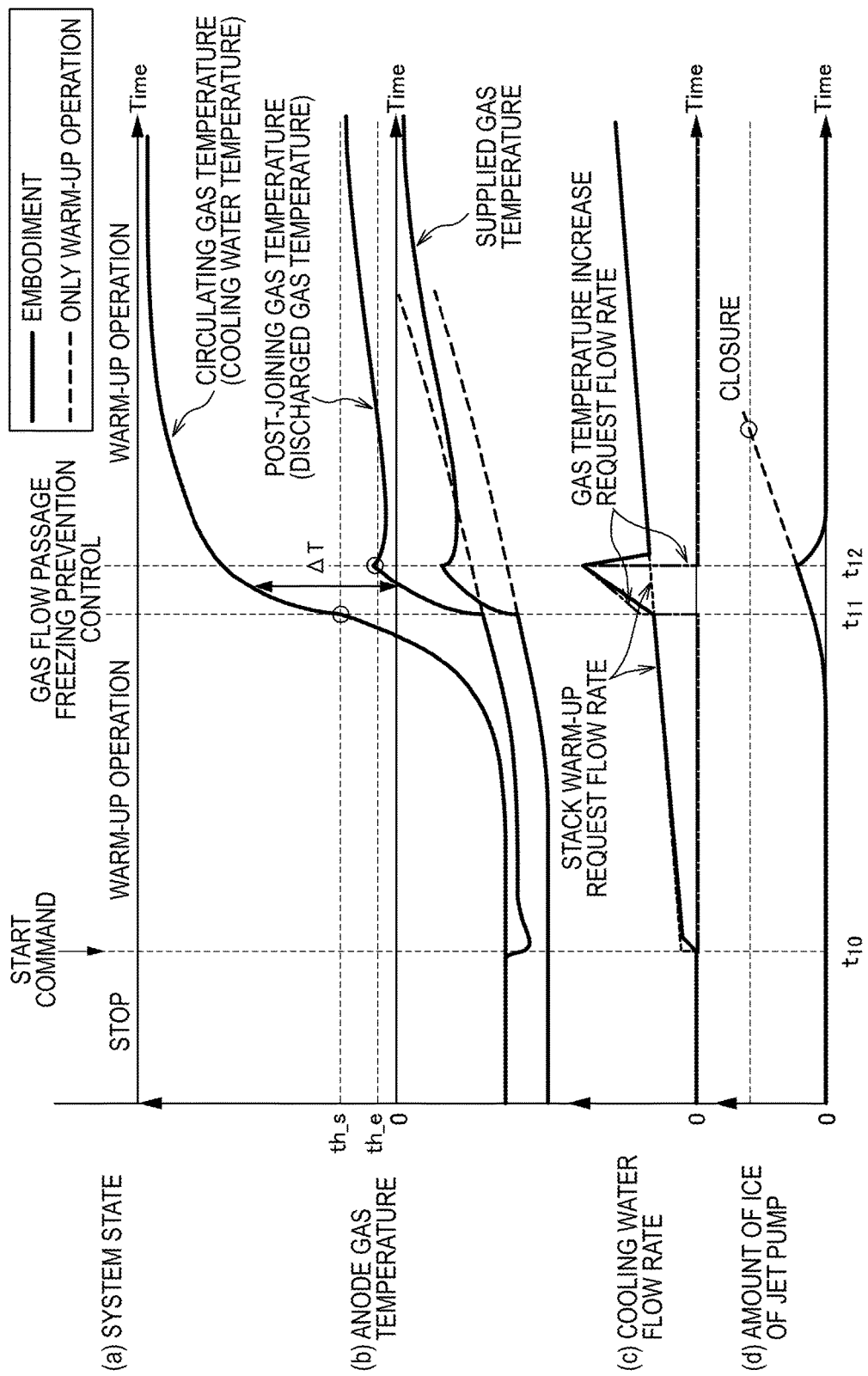

FIG. 10 are time charts when the temperature difference $\Delta T$ becomes larger while the gas freezing prevention control is executed.

A vertical axis of each of FIGS. 10(*a*) to 10(*d*) is the same as that of each of FIGS. 9(*a*) to 9(*d*), and a horizontal axis is a time axis common to each other. Here, a state of the fuel cell system 100 from time t11 to time t12 is described.

At time t11, the cooling water temperature exceeds the moisture increase threshold value Th_s. Thus, the cooling water flow rate control unit 200 switches the cooling water flow rate to the gas temperature increase request flow rate as shown in FIG. 10(*c*). Thereafter, the temperature difference $\Delta T$ between the circulating gas temperature and the discharged gas temperature becomes larger as shown in FIG. 10(*b*). Similarly, the temperature difference between the circulating gas temperature and the supplied gas temperature also becomes larger.

In such a case, the anode gas temperature increasing effect after joining by an increase of the flow rate of the cooling water to be supplied to the heat exchanger 23 becomes larger. Thus, the cooling water flow rate control unit 200 increases the gas temperature increase request flow rate as shown in FIG. 10(*c*). This causes the discharged gas temperature to reach the freezing release threshold value Th_e earlier than the discharged gas temperature from time t1 to time t2 shown in FIG. 9(*b*) as shown in FIG. 10(*b*).

By increasing the gas temperature increase request flow rate as the temperature difference $\Delta T$ increases in this way, the discharged gas temperature can be effectively increased to be higher than the freezing point in a short time.

By increasing and decreasing the gas temperature increase request flow rate according to the temperature difference $\Delta T$ as shown in FIGS. 9 and 10, it is possible to prevent the freezing and closure of the gas flow passage in the jet pump 25 while suppressing an increase of the power consumption of the cooling water pump 32.

According to the second embodiment of the present invention, the gas temperature increase request flow rate calculation unit 232 increases the cooling water flow rate to be higher than the warm-up request flow rate calculated by the warm-up request flow rate calculation unit 221 if the temperature of the anode off-gas to be sucked into the jet pump 25 exceeds the moisture increase threshold value Th_s.

Since the temperature of the anode gas to be supplied from the heat exchanger 23 to the jet pump 25 increases in this way, ice formed in the jet pump 25 can be melted before the jet pump 25 is frozen to close the flow passage.

Further, in the present embodiment, the gas temperature increase request flow rate calculation unit 232 increases an increase amount of the cooling water flow rate from the warm-up request flow rate as the temperature difference between the temperature of the discharged gas discharged from the jet pump 25 and the temperature of the anode off-gas (circulating gas temperature) increases.

Since an increase amount of the cooling water flow rate is increased when the effect of increasing the temperature of the anode gas in the heat exchanger 23 by an increase of the cooling water flow rate is large, the cooling water pump 32 can be efficiently driven.

Further, in the present embodiment, the flow rate correction value calculation unit 233 increases the correction value to increase the gas temperature increase request flow rate as the target current correlated with the supply flow rate of the anode gas increases as shown in FIG. 7. Specifically, the flow rate correction value calculation unit 233 increases an increase amount from the warm-up flow rate to the gas temperature increase request flow rate as the flow rate of the gas to be supplied to the fuel cell stack 1 increases.

To ensure a temperature increasing rate of the anode gas passing through the heat exchanger 23, the amount of heat radiated from the cooling water to the anode gas in the heat exchanger 23 needs to be increased as the flow rate of the anode gas increases. Thus, the temperature of the anode gas can be quickly and reliably increased by correcting the gas temperature increase request flow rate to increase an increase amount from the warm-up request flow rate as the flow rate of the anode gas increases.

Further, in the present embodiment, the flow rate correction value calculation unit 233 increases the correction value to increase the gas temperature increase request flow rate as the HFR correlated with the degree of wetness of the electrolyte membranes of the fuel cells increases as shown in FIG. 7. Specifically, the flow rate correction value calculation unit 233 reduces an increase amount of the cooling water flow rate as the electrolyte membranes of the fuel cells become drier.

If the electrolyte membranes are dry, the amount of steam in the anode off-gas is reduced and an increasing amount of ice formed in the jet pump 25 is reduced. Thus, by correcting the gas temperature increase request flow rate to reduce the increase amount of the cooling water flow rate as the electrolyte membranes become drier, it is possible to reduce the power consumption of the cooling water pump 32 while suppressing the freezing of the jet pump 25.

Further, in the present embodiment, the gas flow passage freezing prevention flag is set off if the temperature of the gas discharged from the jet pump 25 (discharged gas temperature) exceeds the freezing release threshold value Th_e. The switcher 320 outputs zero as the value for releasing the gas temperature increase request flow rate when the gas flow passage freezing prevention flag is set off. Specifically, the switcher 320 limits an increase of the flow rate of the cooling water to be supplied to the heat exchanger 23 on the basis of the temperature of the gas discharged from the jet pump 25.

Since the cooling water flow rate can be prevented from being unnecessarily increased in this way, an increase of the power consumption of the cooling water pump 32 can be suppressed. Further, the warm-up of the fuel cell stack 1 can be promoted by limiting an increase of the cooling water flow rate.

Further, in the present embodiment, the discharged gas temperature calculation unit 120 calculates the discharged gas temperature on the basis of the temperature of the gas supplied from the heat exchanger 23 to the jet pump 25 and the temperature of the gas to be circulated to jet pump 25.

When the discharged gas temperature increases to the freezing release threshold value (limit threshold value) of e.g. 0° C., the switcher 320 switches the flow rate of the cooling water to be supplied to the heat exchanger 23 to the warm-up request flow rate smaller than the gas temperature increase request flow rate.

In this way, it is possible to promote the warm-up of the fuel cell stack 1 while suppressing an unnecessary increase of the cooling water flow rate. Further, since it is not necessary to newly provide a block for limiting the cooling water flow rate, a calculation load can be suppressed.

It should be noted that an example of increasing the flow rate of the cooling water to be supplied to the heat exchanger 23 from the warm-up request flow rate when the circulating gas temperature is not lower than the moisture increase threshold value Th_s and the discharged gas temperature is not higher than the freezing release threshold value Th_e has been described in the present embodiment.

In such a case, the gas flow passage freezing prevention control unit 230 may increase the flow rate of the cooling water to be supplied to the heat exchanger 23 from the warm-up request flow rate when the circulating gas temperature is not lower than the freezing point and the discharged gas temperature is not higher than the freezing point.

The moisture increase threshold value Th_s and the freezing release threshold value Th_e are set at 0° C. in this way for the following reason. Firstly, no ice is generated in the jet pump 25 unless the discharged gas temperature is not higher than 0° C. Further, as shown in FIG. 9, the amount of steam contained in the anode off-gas is very small even if the post-joining gas temperature is not higher than the freezing point unless the circulating gas temperature is higher than the 0° C. This, ice is hardly generated in the jet pump 25.

Accordingly, ice generated in the jet pump 25 increases when the circulating gas temperature is not lower than 0° C. and the discharged gas temperature is not higher than 0° C. Thus, the cooling water flow rate is increased when such conditions hold. In this way, the anode gas is heated by the heat exchanger 23 only in a state where ice increases in the jet pump 25, wherefore the freezing of the jet pump 25 can be precisely prevented.

(Third Embodiment)

Figure 11:
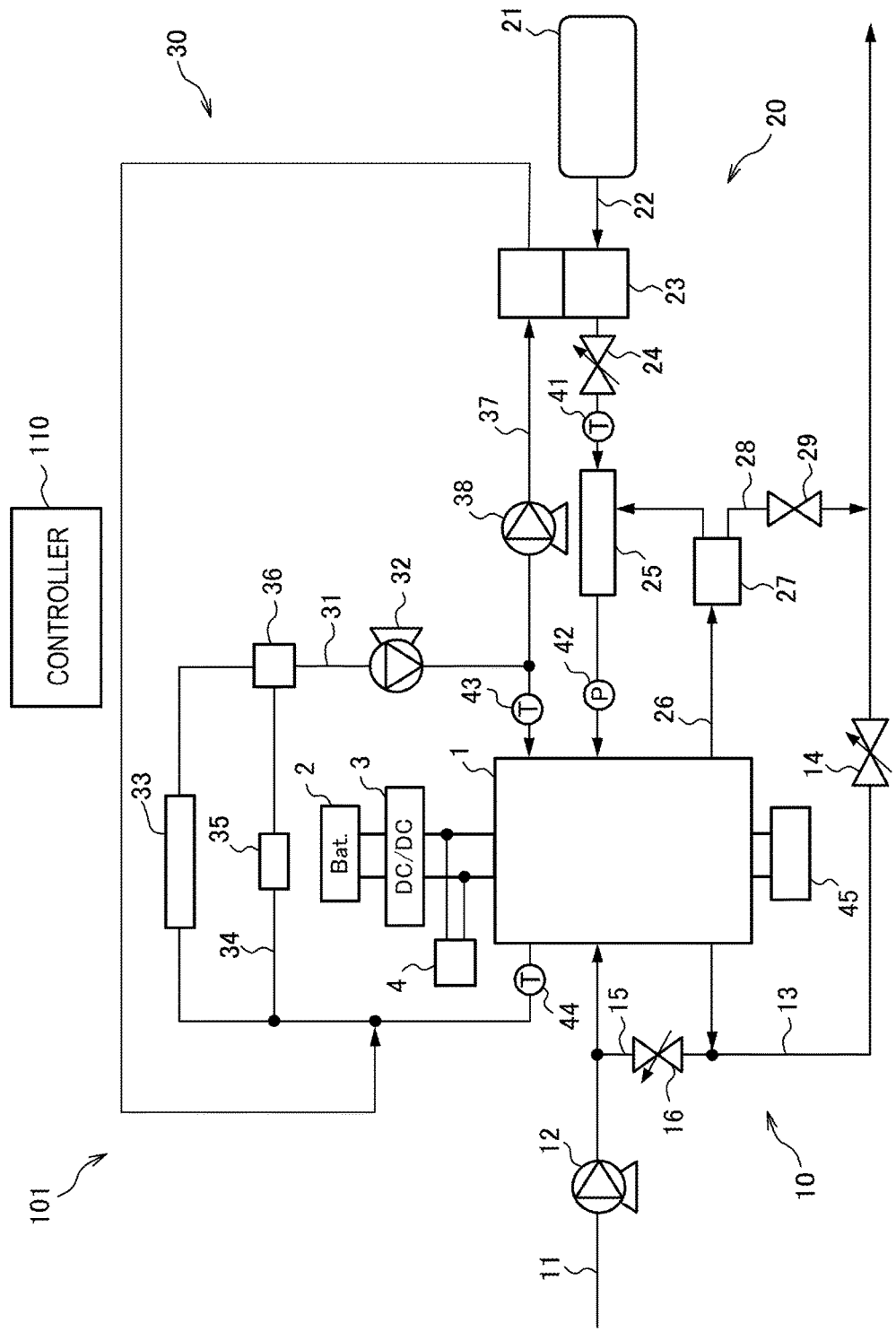
FIG. 11 is a diagram showing the configuration of a fuel cell system in a third embodiment of the present invention.

FIG. 11 is a diagram showing a configuration example of a fuel cell system 101 in a third embodiment of the present invention.

The fuel cell system 101 includes a bypass cooling water pump 38 in addition to the configuration of the fuel cell system 100 shown in FIG. 1. In the following description, the same components as in the fuel cell system 100 are denoted by the same reference signs and not described.

The bypass cooling water pump 38 is provided in a branch passage 37 located between a part where the branch passage 37 is branched off from a cooling water circulation passage 31 and a heat exchanger 23. The bypass cooling water pump 38 is controlled by a controller 110.

The controller 110 increases a flow rate of cooling water supplied from the bypass cooling water pump 38 to the heat exchanger 23 if a gas flow passage freezing prevention flag is switched on in Step S107 of FIG. 3.

Figure 12:
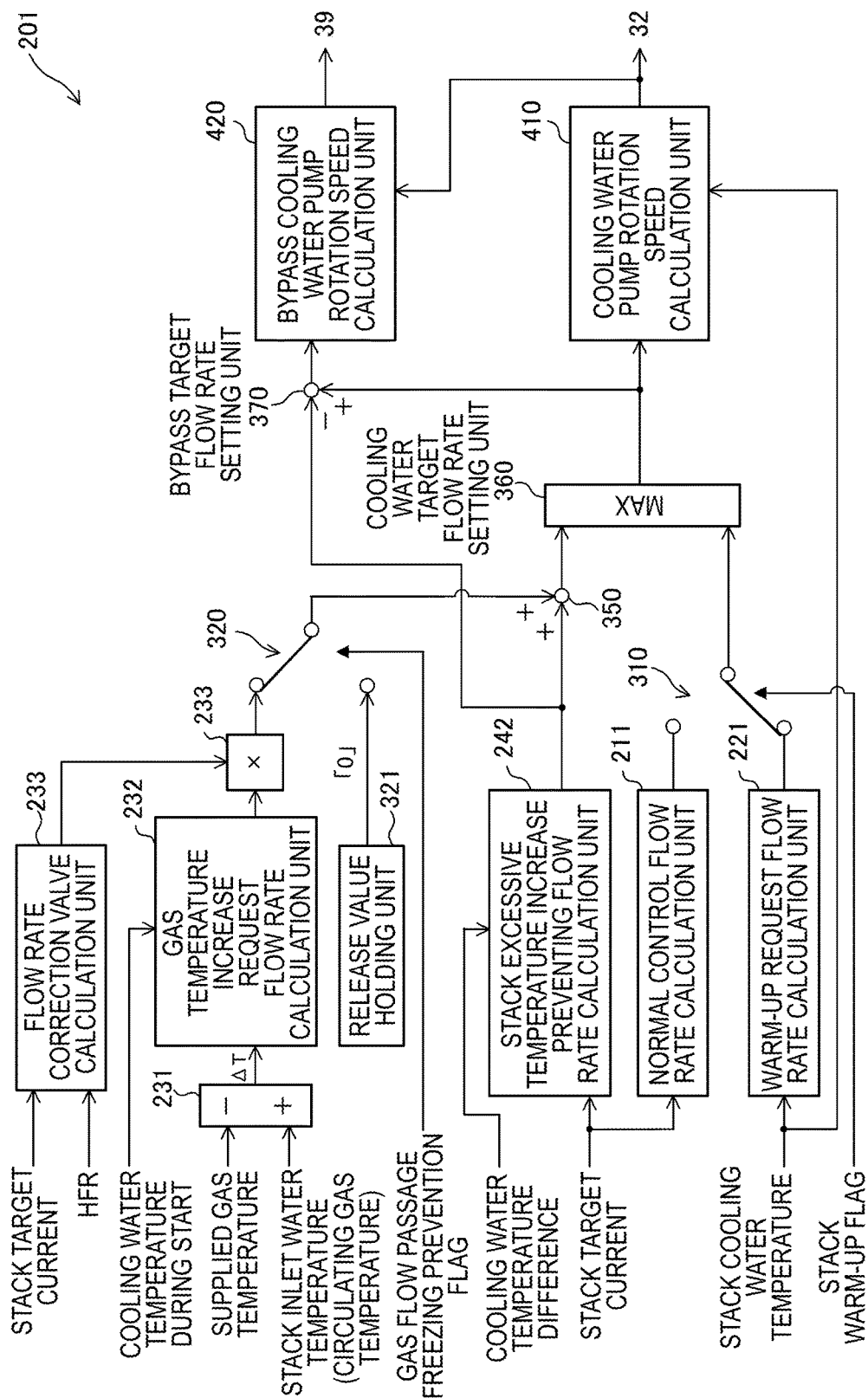
FIG. 12 is a diagram showing the configuration of a cooling water flow rate control unit in the third embodiment.

FIG. 12 is a block diagram showing an example of the configuration of a cooling water flow rate control unit 201 provided in the controller 110 in the present embodiment.

The cooling water flow rate control unit 201 includes an adder 350, a cooling water target flow rate setting unit 360 and a bypass target flow rate setting unit 370 instead of the request flow rate setting unit 330 and the cooling water target flow rate setting unit 340 shown in FIG. 5. Since the other components are the same as those of the cooling water flow rate control unit 200 shown in FIG. 5, they are denoted by the same reference signs and not described.

The adder 350 adds a gas temperature increase request flow rate after correction or zero output from a switcher 320 to an excessive temperature increase preventing flow rate. For example, if the gas flow passage freezing prevention flag is set on, the adder 350 outputs a value obtained by adding the gas temperature increase request flow rate to the excessive temperature increase preventing flow rate as a total cooling water flow rate to the cooling water target flow rate setting unit 360.

The cooling water target flow rate setting unit 360 sets the larger one of the total cooling water flow rate output from the adder 350 and a normal control flow rate or warm-up request flow rate output from a switcher 310 as a cooling water target flow rate. Then, the cooling water target flow rate setting unit 360 outputs the cooling water target flow rate to each of the bypass target flow rate setting unit 370 and a cooling water pump rotation speed calculation unit 410.

For example, when the gas flow passage freezing prevention flag is set on with a stack warm-up flag set on, the cooling water target flow rate setting unit 360 outputs the total cooling water flow rate output from the adder 350 as the cooling water target flow rate.

Further, when the gas flow passage freezing prevention flag is set off with the stack warm-up flag set on, the cooling water target flow rate setting unit 360 outputs the excessive temperature increase preventing flow rate output from the adder 350 as the cooling water target flow rate.

The bypass target flow rate setting unit 370 outputs a value obtained by subtracting the excessive temperature increase preventing flow rate from the cooling water target flow rate as a set value of the bypass target flow rate to the bypass cooling water pump rotation speed calculation unit 420.

For example, when the gas flow passage freezing prevention flag is set on with the stack warm-up flag set on, the bypass target flow rate setting unit 370 outputs a value obtained by subtracting the excessive temperature increase preventing flow rate from the total cooling water flow rate, i.e. the gas temperature increase request flow rate.

In this way, the cooling water is supplied to the fuel cell stack 1 at a flow rate equivalent to the excessive temperature increase preventing flow rate by the cooling water pump 32 and supplied to the heat exchanger 23 at a flow rate equivalent to the gas temperature increase request flow rate by the bypass cooling water pump 38.

Further, when the gas flow passage freezing prevention flag is set off with the stack warm-up flag set on, the bypass target flow rate setting unit 370 outputs a value obtained by subtracting the excessive temperature increase preventing flow rate from the warm-up request flow rate.

In this way, the cooling water is supplied to the fuel cell stack 1 at a flow rate equivalent to the warm-up request flow rate by the cooling water pump 32 and supplied to the heat exchanger 23 at a flow rate equivalent to the excessive temperature increase preventing flow rate by the bypass cooling water pump 38.

The cooling water pump rotation speed calculation unit 410 calculates a rotation speed of the cooling water pump 32 on the basis of the cooling water target flow rate. Further, the cooling water pump rotation speed calculation unit 410 corrects the rotation speed of the cooling water pump 32 according to the cooling water temperature of the fuel cell stack 1.

In the present embodiment, a rotation speed command map indicating a relationship between the cooling water target flow rate and the cooling water pump rotation speed for each cooling water temperature is stored in the cooling water pump rotation speed calculation unit 410. The rotation speed command map is described later with reference to FIG. 13.

When obtaining the cooling water temperature and the cooling water target flow rate, the cooling water pump rotation speed calculation unit 410 refers to the rotation speed command map specified by the cooling water temperature and calculates the rotation speed associated with the cooling water target flow rate. The cooling water pump rotation speed calculation unit 410 commands that rotation speed to the cooling water pump 32.

The bypass cooling water pump rotation speed calculation unit 420 calculates a rotation speed of the bypass cooling water pump 38 on the basis of a bypass target flow rate. Further, the bypass cooling water pump rotation speed calculation unit 420 corrects the rotation speed of the bypass cooling water pump 38 according to the rotation speed of the cooling water pump 32.

It should be noted that the bypass cooling water pump rotation speed calculation unit 420 may increase the rotation speed of the bypass cooling water pump 38 as the cooling water temperature of the fuel cell stack 1 decreases since the cooling water becomes less viscous.

In the present embodiment, a bypass rotation speed command map indicating a relationship between the bypass target flow rate and the bypass cooling water pump rotation speed for each rotation speed of the cooling water pump 32 is stored in the bypass cooling water pump rotation speed calculation unit 420. The bypass rotation speed command map is described later with reference to FIG. 14.

When obtaining the bypass target flow rate and the rotation speed of the cooling water pump 32, the bypass cooling water pump rotation speed calculation unit 420 refers to the bypass rotation speed command map specified by the rotation speed of the cooling water pump 32 and calculates the rotation speed associated with the bypass target flow rate. The bypass cooling water pump rotation speed calculation unit 420 commands that rotation speed to the bypass cooling water pump 38.

Figure 13:
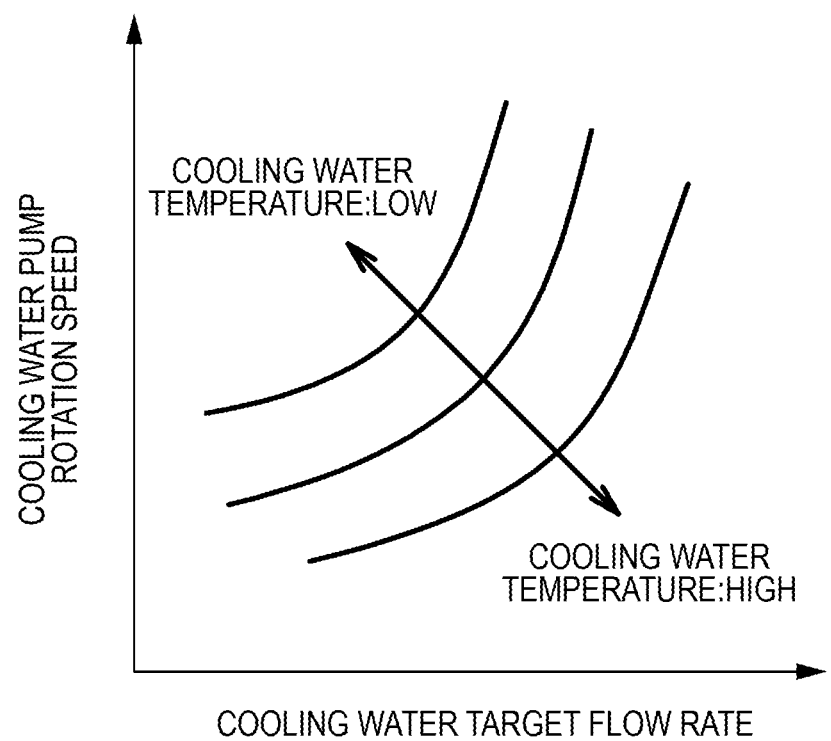
FIG. 13 is a graph showing a rotation speed command map of a cooling water pump.

FIG. 13 is a graph showing an example of the rotation speed command map stored in the cooling water pump rotation speed calculation unit 410.

As shown in FIG. 13, the cooling water target flow rate and the rotation speed of the cooling water pump 32 are associated with each other for each cooling water temperature of the fuel cell stack 1 in the rotation speed command map. In the rotation speed command map, the rotation speed of the cooling water pump 32 nonlinearly increases as the cooling water target flow rate increases. Further, at the same cooling water target flow rate, the rotation speed of the cooling water pump 32 increases as the cooling water temperature decreases since the cooling water becomes less viscous.

Figure 14:
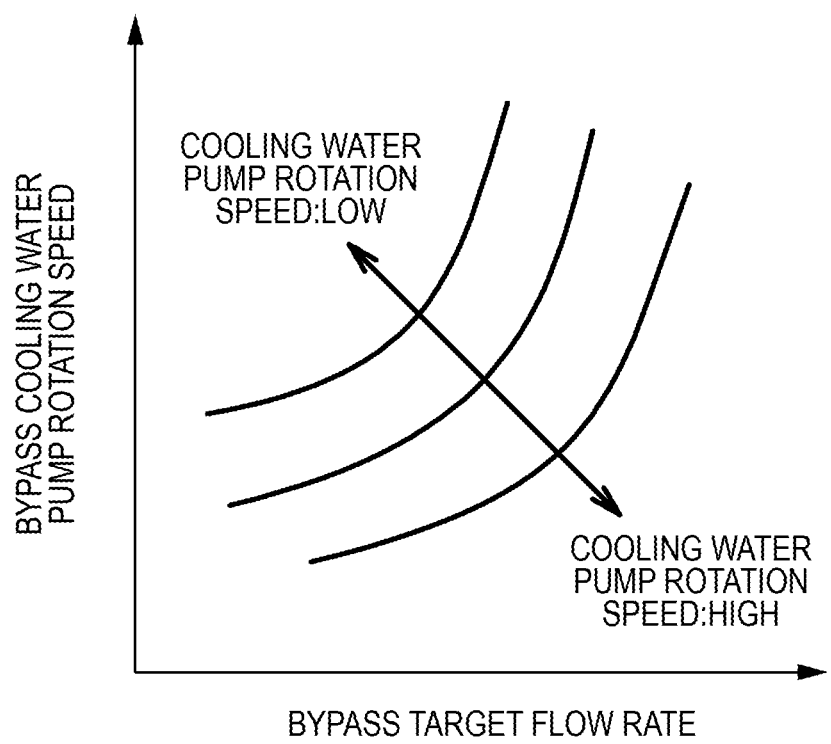
FIG. 14 is a graph showing a rotation speed command map of a bypass cooling water pump.

FIG. 14 is a graph showing an example of the bypass rotation speed command map stored in the bypass cooling water pump rotation speed calculation unit 420.

As shown in FIG. 14, the bypass target flow rate and the rotation speed of the bypass cooling water pump 38 are associated with each other for each rotation speed of the cooling water pump 32 in the bypass rotation speed command map.

In the bypass rotation speed command map, the rotation speed of the bypass cooling water pump 38 nonlinearly increases as the bypass target flow rate increases. Further, at the same bypass target flow rate, the rotation speed of the bypass cooling water pump 38 increases as the rotation speed of the cooling water pump 32 decreases since the cooling water becomes less likely to flow into the heat exchanger 23 via the bypass cooling water pump 38.

According to the third embodiment of the present invention, the bypass cooling water pump 38 is provided in the branch passage 37 branched off from the cooling water circulation passage 31. The cooling water flow rate control unit 201 increases the rotation speed of the bypass cooling water pump 38 to increase the flow rate of the cooling water to be supplied to the heat exchanger 23 to be more than the warm-up request flow rate of the cooling water to be supplied to the fuel cell stack 1 when the gas flow passage freezing prevention flag is set on.

Since the temperature of the anode gas to be supplied to the jet pump 25 increases and the temperature of the anode gas discharged from the jet pump 25 increases to the freezing point in a short time in this way, the closure of the flow passage by ice generated in the jet pump 25 can be prevented.

(Fourth Embodiment)

Figure 15:
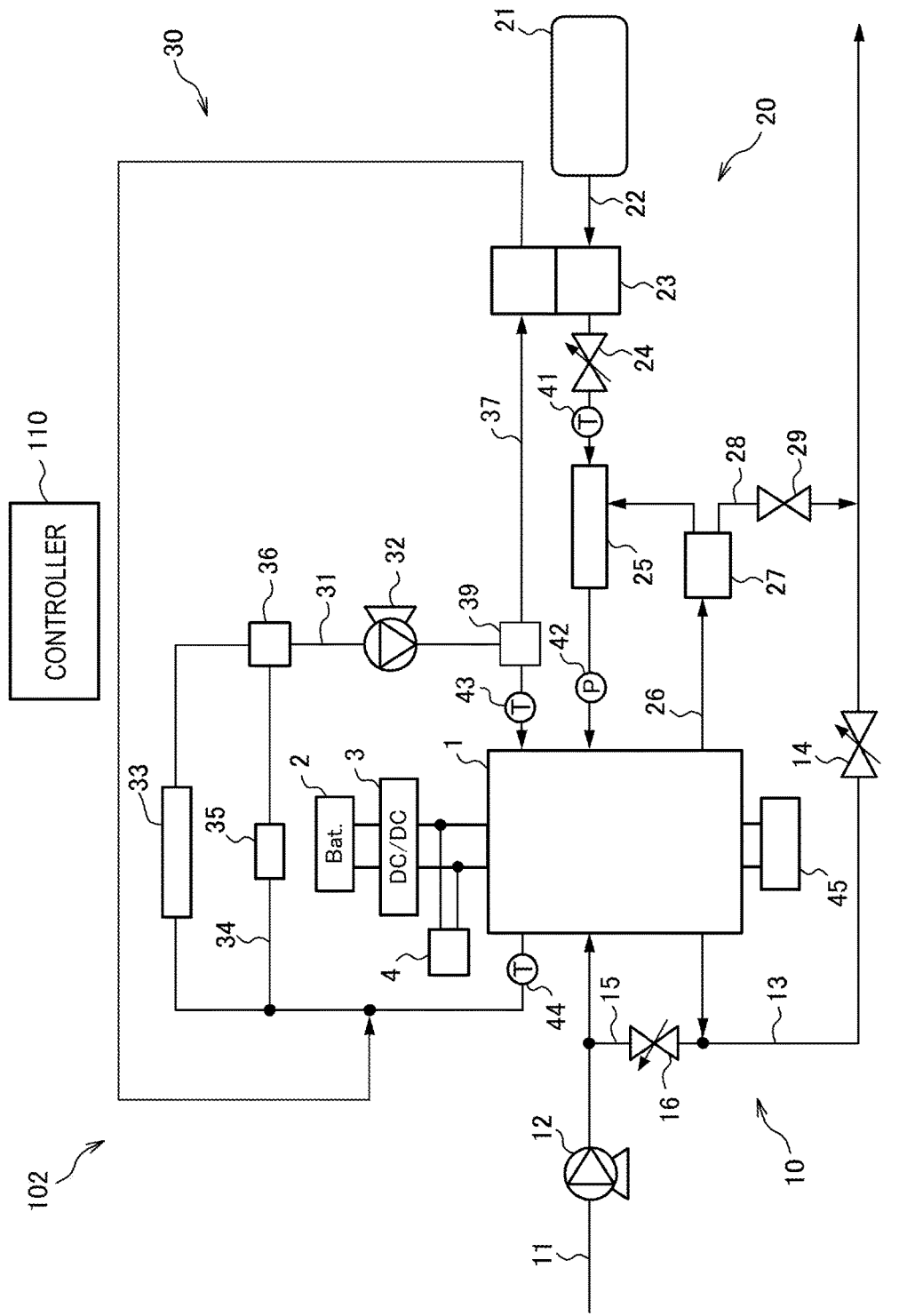
FIG. 15 is a diagram showing the configuration of a fuel cell system in a fourth embodiment of the present invention.

FIG. 15 is a diagram showing a configuration example of a fuel cell system 102 in a fourth embodiment of the present invention.

The fuel cell system 102 includes a bypass valve 39 instead of the bypass cooling water pump 38 of the fuel cell system 101 shown in FIG. 11. In the following description, the same components as in the fuel cell system 101 are denoted by the same reference signs and not described.

The bypass valve 39 is a three-way valve provided in a part where a branch passage 37 is branched off from a cooling water circulation passage 31. The bypass valve 39 is controlled by a controller 110.

The controller 110 increases a flow rate of cooling water supplied from the bypass valve 39 to a heat exchanger 23 if a gas flow passage freezing prevention flag is switched from off to on in Step S107 of FIG. 3.

Figure 16:
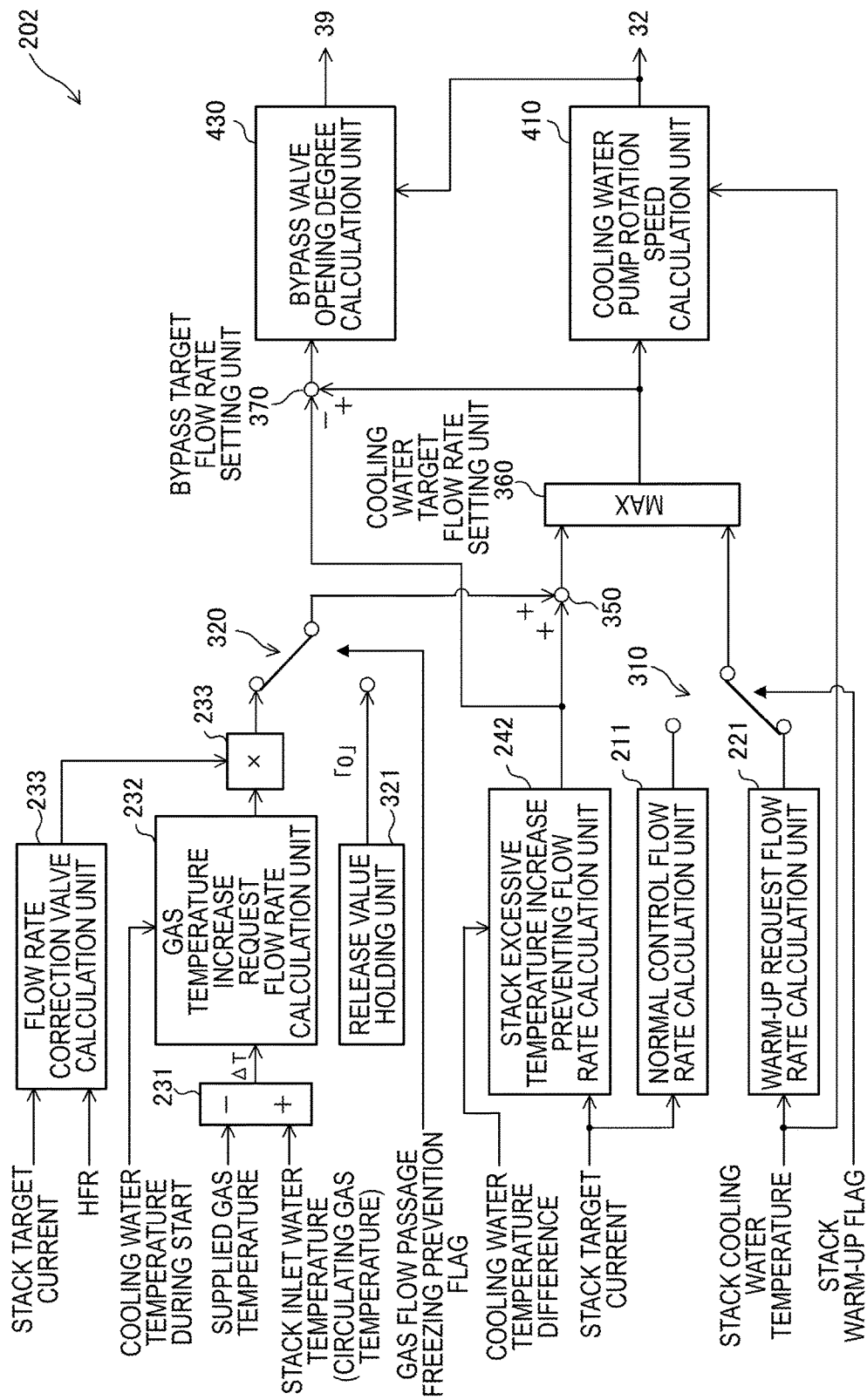
FIG. 16 is a diagram showing the configuration of a cooling water flow rate control unit in the fourth embodiment.

FIG. 16 is a block diagram showing an example of the configuration of a cooling water flow rate control unit 202 provided in the controller 110 in the present embodiment.

The cooling water flow rate control unit 202 includes a bypass valve opening degree calculation unit 430 instead of the bypass cooling water pump rotation speed calculation unit 420 shown in FIG. 12. Since the other components are the same as those of the cooling water flow rate control unit 200 shown in FIG. 5, they are denoted by the same reference signs and not described.

The bypass valve opening degree calculation unit 430 calculates an opening degree of the bypass valve 39 on the basis of a bypass target flow rate. Further, the bypass valve opening degree calculation unit 430 corrects the opening degree of the bypass valve 39 according to the cooling water temperature of a fuel cell stack 1. Further, the bypass valve opening degree calculation unit 430 may reduce the opening degree of the bypass valve 39 as a rotation speed of a cooling water 32 increases.

In the present embodiment, a bypass opening degree command map indicating a relationship between the bypass target flow rate and the opening degree of the bypass valve 39 for each cooling water temperature of the fuel cell stack 1 is stored in advance in the bypass valve opening degree calculation unit 430.

Figure 17:
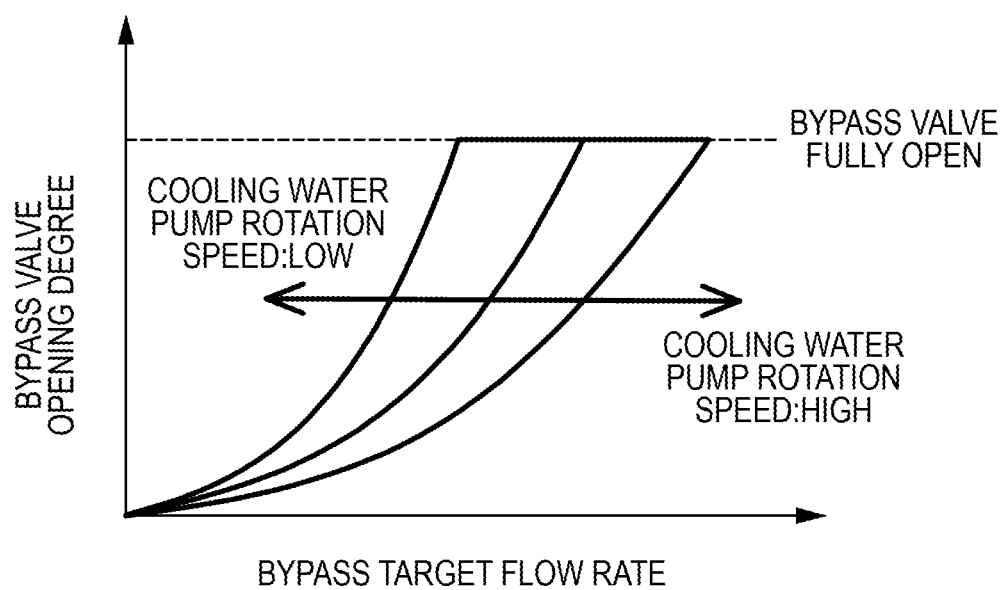
FIG. 17 is a graph showing a bypass valve opening degree command map.

FIG. 17 is a graph showing an example of the bypass opening degree command map stored in the bypass valve opening degree calculation unit 430. Here, the flow rate of the cooling water to be supplied to the heat exchanger 23 is increased by opening the bypass valve 39 as the opening degree of the bypass valve 39 increases.

As shown on FIG. 17, the bypass target flow rate and the opening degree of the bypass valve 39 are associated with each other for each rotation speed of the cooling water pump 32 in the bypass opening degree command map.

In the bypass opening degree command map, the opening degree of the bypass valve 39 nonlinearly increases as the bypass target flow rate increases. Further, at the same bypass target flow rate, the opening degree of the bypass valve 39 increases as the rotation speed of the cooling water 32 decreases since the cooling water becomes less likely to flow into the heat exchanger 23.

When obtaining the bypass target flow rate and the rotation speed of the cooling water pump 32, the bypass valve opening degree calculation unit 430 refers to the bypass opening degree command map specified by the rotation speed of the cooling water pump 32 and calculates the opening degree associated with the bypass target flow rate. Then, the bypass valve opening degree calculation unit 430 commands that opening degree to the bypass valve 39.

According to the fourth embodiment of the present invention, the bypass valve 39 is provided in the branch passage 37 branched off from the cooling water circulation passage 31. The cooling water flow rate control unit 202 opens the bypass valve 39 to increase the flow rate of the cooling water to be supplied to the heat exchanger 23 to be more than the warm-up request flow rate of the cooling water to be supplied to the fuel cell stack 1 when the gas flow passage freezing prevention flag is set on.

Since the temperature of the anode gas to be supplied to the jet pump 25 increases and the temperature of the anode gas discharged from the jet pump 25 increases to the freezing point in a short time in this way, the closure of the flow passage by ice generated in the jet pump 25 can be prevented.

Although the embodiments of the present invention have been described above, the above embodiments are merely an illustration of some application examples of the present invention and not intended to limit the technical scope of the present invention to the specific configurations of the above embodiments.

It should be noted that the above embodiments can be combined as appropriate.

The present application claims the benefit of priority from Japanese Patent Application No. 2014-151268, filed in the Japan Patent Office on Jul. 24, 2014, the disclosure of which is incorporated herein by reference in its entirety.

The invention claimed is:

1. A fuel cell system for supplying anode gas and cathode gas to a fuel cell and causing the fuel cell to generate power according to a load, comprising:
   a gas supply passage configured to supply one of the anode gas and the cathode gas to the fuel cell;
   a refrigerant supply apparatus configured to supply refrigerant for cooling the fuel cell to the fuel cell;
   a heat exchanger configured to exchange heat between the refrigerant increased in temperature by the fuel cell and the gas supplied to the gas supply passage;
   a component provided in the gas supply passage and configured to circulate the one of the anode gas and the cathode gas discharged from the fuel cell to the fuel cell;
   a warm-up control unit configured to control a flow rate of the refrigerant to a predetermined flow rate for warming up the fuel cell when the fuel cell is warmed up; and
   a gas temperature increase control unit configured to increase the flow rate of the refrigerant to be supplied to the heat exchanger on the basis of a temperature of circulation gas circulated by the component or a parameter related to the temperature of the circulation gas and a temperature of supplied gas before joining with the circulation gas when the flow rate of the refrigerant is controlled by the warm-up control unit.

2. The fuel cell system according to claim 1, wherein:
the gas temperature increase control unit increases the flow rate of the refrigerant when a temperature of circulating gas circulated from the fuel cell to the component is not lower than a freezing point temperature and a temperature of discharged gas discharged from the component to the fuel cell is not higher than the freezing point temperature.

3. The fuel cell system according to claim 1, wherein:
the gas temperature increase control unit increases the flow rate of the refrigerant to be higher than the flow rate controlled by the warm-up control unit when a temperature of circulating gas circulated from the fuel cell to the component exceeds a predetermined threshold value beyond which an amount of steam in the circulating gas increases.

4. The fuel cell system according to claim 3, wherein:
the gas temperature increase control unit increases the flow rate of the refrigerant as a temperature difference increases, the temperature difference being a difference between a temperature of discharged gas discharged from the component to the fuel cell and a temperature of circulating gas.

5. The fuel cell system according to claim 3, wherein:
the gas temperature increase control unit increases the flow rate of the refrigerant as a supply flow rate of the gas to be supplied to the fuel cell increases.

6. The fuel cell system according to claim 3, wherein:
the gas temperature increase control unit decreases an increase amount of the flow rate of the refrigerant as an electrolyte membrane of the fuel cell becomes drier.

7. The fuel cell system according to claim 1, wherein:
the gas temperature increase control unit limits an increase of the flow rate of the refrigerant to be supplied to the heat exchanger on the basis of a temperature of discharged gas discharged from the component to the fuel cell.

8. The fuel cell system according to claim 7, further comprising:
a calculation unit configured to calculate the temperature of the discharged gas on the basis of a temperature of supplied gas supplied from the heat exchanger to the component and a temperature of circulating gas circulated from the fuel cell to the component, wherein:
the gas temperature increase control unit switches the flow rate of the refrigerant to be supplied to the heat exchanger to the flow rate controlled by the warm-up control unit when the temperature of the discharged gas increases to a limit threshold value determined on the basis of a freezing point temperature after the flow rate of the refrigerant is increased.

9. The fuel cell system according to claim 1, wherein:
the parameter related to the temperature includes a temperature of the refrigerant.

10. A control method for a fuel cell system for supplying anode gas and cathode gas to a fuel cell and causing the fuel cell to generate power according to a load, the fuel cell system including a gas supply passage configured to supply one of the anode gas and the cathode gas to the fuel cell, a refrigerant supply apparatus configured to supply refrigerant for cooling the fuel cell to the fuel cell, a heat exchanger configured to exchange heat between the refrigerant increased in temperature by the fuel cell and the gas supplied to the gas supply passage, and a component provided in the gas supply passage and configured to circulate gas discharged from the fuel cell to the fuel cell, the control method comprising:

a warm-up control step of controlling a flow rate of the refrigerant to a predetermined flow rate for warming up the fuel cell when the fuel cell is warmed up; and
a gas temperature increase control step of increasing the flow rate of the refrigerant to be supplied to the heat exchanger on the basis of a temperature of circulation gas circulated by the component or a parameter related to the temperature of the circulation gas and a temperature of supplied gas before joining the circulation gas when the flow rate of the refrigerant is controlled by the warm-up control step.

11. A fuel cell system for supplying anode gas and cathode gas to a fuel cell and causing the fuel cell to generate power according to a load, comprising:
a gas supply passage configured to supply one of the anode gas and the cathode gas to the fuel cell;
a refrigerant supply configured to supply refrigerant for cooling the fuel cell to the fuel cell;
a heat exchanger configured to exchange heat between the refrigerant increased in temperature by the fuel cell and the gas supplied to the gas supply passage;
a component provided in the gas supply passage and configured to circulate the one of the anode gas and the cathode gas discharged from the fuel cell to the fuel cell;
a controller configured to execute:
a warm-up control step of controlling a flow rate of the refrigerant to a predetermined flow rate for warming up the fuel cell when the fuel cell is warmed up; and
a gas temperature increase control step of increasing the flow rate of the refrigerant to be supplied to the heat exchanger on the basis of a temperature of circulation gas circulated by the component or a parameter related to the temperature of the circulation gas and a temperature of supplied gas before joining the circulation gas when the flow rate of the refrigerant is controlled by the warm-up control step.

12. The fuel cell system according to claim 11, wherein:
in the gas temperature increase control step, the controller is configured to increase the flow rate of the refrigerant when a temperature of circulating gas circulated from the fuel cell to the component is not lower than a freezing point temperature and a temperature of discharged gas discharged from the component to the fuel cell is not higher than the freezing point temperature.

13. The fuel cell system according to claim 11, wherein:
in the gas temperature increase control step, the controller is configured to increase the flow rate of the refrigerant to be higher than the flow rate in the warm-up control step when a temperature of circulating gas circulated from the fuel cell to the component exceeds a predetermined threshold value beyond which an amount of steam in the circulating gas increases.

14. The fuel cell system according to claim 13, wherein:
in the gas temperature increase control step, the controller is configured to increase the flow rate of the refrigerant as a temperature difference increases, the temperature difference being a difference between a temperature of discharged gas discharged from the component to the fuel cell and a temperature of circulating gas.

15. The fuel cell system according to claim 13, wherein:
in the gas temperature increase control step, the controller is configured to increase the flow rate of the refrigerant as a supply flow rate of the gas to be supplied to the fuel cell increases.

16. The fuel cell system according to claim 13, wherein:
in the gas temperature increase control step, the controller is configured to decrease an increase amount of the flow rate of the refrigerant as an electrolyte membrane of the fuel cell becomes drier.

17. The fuel cell system according to claim 11, wherein:
in the gas temperature increase control step, the controller is configured to limit an increase of the flow rate of the refrigerant to be supplied to the heat exchanger on the basis of a temperature of discharged gas discharged from the component to the fuel cell.

18. The fuel cell system according to claim 17, wherein:
the controller is further configured to calculate the temperature of the discharged gas on the basis of a temperature of supplied gas supplied from the heat exchanger to the component and a temperature of circulating gas circulated from the fuel cell to the component, in the gas temperature increase control step, the controller is configured to switch the flow rate of the refrigerant to be supplied to the heat exchanger to the flow rate in the warm-up control step when the temperature of the discharged gas increases to a limit threshold value determined on the basis of a freezing point temperature after the flow rate of the refrigerant is increased.

19. The fuel cell system according to claim 11, wherein:
the parameter related to the temperature of the circulation gas includes a temperature of the refrigerant.

\* \* \* \* \*